United States Patent
Nagura et al.

(10) Patent No.: US 10,244,547 B2
(45) Date of Patent: Mar. 26, 2019

(54) RADIO COMMUNICATION TERMINAL

(71) Applicant: DENSO CORPORATION, Kariya, Aichi-pref. (JP)

(72) Inventors: Toru Nagura, Kariya (JP); Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/945,102

(22) Filed: Apr. 4, 2018

(65) Prior Publication Data

US 2018/0295634 A1    Oct. 11, 2018

(30) Foreign Application Priority Data

Apr. 6, 2017    (JP) .................... 2017-076039

(51) Int. Cl.
*H04W 72/10*    (2009.01)
*H04M 15/00*    (2006.01)
(Continued)

(52) U.S. Cl.
CPC ........... *H04W 72/10* (2013.01); *H04M 15/80* (2013.01); *H04W 4/24* (2013.01); *H04W 52/146* (2013.01)

(58) Field of Classification Search
CPC ............... H04W 52/146; H04W 72/04; H04W 28/0278; H04W 72/10; H04W 72/1236;
(Continued)

(56) References Cited

U.S. PATENT DOCUMENTS

2004/0082364 A1*    4/2004    Kitazawa ................ H04L 47/14
                                                                    455/560
2004/0095237 A1*    5/2004    Chen .................... G06F 11/0748
                                                                    340/506
(Continued)

FOREIGN PATENT DOCUMENTS

JP    2004-140604 A    5/2004
JP    2006-157323 A    6/2006
(Continued)

*Primary Examiner* — Fred A Casca
(74) *Attorney, Agent, or Firm* — Knobbe, Martens, Olson & Bear, LLP

(57) ABSTRACT

A radio communication terminal comprises a data classification part, a data value unit price determination part, a transmission value unit price determination part, a transmission order control part, a resource allocation part and a transmission part. The data classification part acquires transmission data from a data supply source, classifies the transmission data by priority class based on a communication quality request, which is determined by types of the transmission data, and stores the transmission data in a priority buffer in correspondence to the priority class. The data value unit price determination part determines a data value unit price of the transmission data. The transmission value unit price determination part determines a transmission data value unit price based on the data value unit price. The transmission order control part assigns a transmission order to the transmission data having the transmission data value unit price higher than a predetermined transmission threshold value. The resource allocation part allocates a communication resource to the transmission data based on the transmission order. The transmission part transmits the transmission data by the communication resource allocated by the resource allocation part.

21 Claims, 23 Drawing Sheets

(51) Int. Cl.
*H04W 4/24* (2018.01)
*H04W 52/14* (2009.01)

(58) Field of Classification Search
CPC .............. H04W 72/1268; H04W 24/10; H04W 28/0236; H04W 28/06; H04W 28/08; H04W 28/14; H04W 72/1247
USPC ......... 455/450, 127.1, 451, 452.1, 464, 522, 455/560; 370/329, 252, 311
See application file for complete search history.

(56) References Cited

U.S. PATENT DOCUMENTS

| | | | |
|---|---|---|---|
| 2006/0203731 A1* | 9/2006 | Tiedemann, Jr. ....... | H04L 47/10 370/235 |
| 2012/0275323 A1 | 11/2012 | Reznik et al. | |
| 2013/0107890 A1* | 5/2013 | Hyoudou ................ | H04L 47/17 370/412 |
| 2015/0334732 A1 | 11/2015 | Caretti et al. | |
| 2016/0126975 A1* | 5/2016 | Lutz ........................ | G06F 7/483 708/204 |
| 2018/0061288 A1* | 3/2018 | Kubota .................. | G09G 3/001 |

FOREIGN PATENT DOCUMENTS

| | | | |
|---|---|---|---|
| JP | 2007-036805 A | 2/2007 |
| JP | 2007-228148 A | 9/2007 |
| JP | 2015-173473 A | 10/2015 |
| JP | 2016-502362 A | 1/2016 |

* cited by examiner

FIG. 3

| | BAND RESERVATION | | BAND GUARANTEE | BEST EFFORT | | |
|---|---|---|---|---|---|---|
| REAL TIME PROPERTY | (UNKNOWN) | | | | SOFT | |
| PRIORITY CLASS | CONTROL | HARD | FIRM | | | |
| | | CONTROL | | | | |
| QUEUE | | | | | | |
| SERVICE ID | QUERY | ELECTRONIC COUPLING | REMOTE MONITOR | ROAD ENVIRONMENT ANOMALY DETECTION | ROAD ENVIRONMENT ANOMALY DETECTION | ROAD ENVIRONMENT ANOMALY DETECTION |
| DATA ID | — | CONTROL SIGNAL | IMAGE | IMAGE | CAN | IMAGE (SAVE) |
| SERVICE ID | | | | | FAILURE DIAGNOSIS | |
| DATA ID | | | | | CAN | |

(columns: UP3, UP1, UP3, UP7, UP9; queue markers d31,d32 ; d71,d72,d73,d74 ; d91)

FIG. 4

| SERVICE NAME (SERVICE ID) | DATA TYPE (DATA ID) | LINK | TRANSMISSION FREQUENCY | REAL TIME PROPERTY | PRIORITY CLASS | QoS | | DATA VALUE UNIT PRICE |
|---|---|---|---|---|---|---|---|---|
| | | | | | | TRANSMISSION DELAY | TRANSMISSION CAPACITY | |
| REMOTE CONTROL CLOUD APPLICATION | IMAGE | UL | REPETITION RATE 100 ms | FIRM | U_P1 | 250 ms | 10Mbps | ¥10/MB |
| ROAD ENVIRONMENT ANOMALY DETECTION CLOUD APPLICATION | IMAGE | UL | IMMEDIATE | SOFT | U_P3 | 30 sec | 3MB | ¥0.4/MB |
| | CAN | UL | REPETITION RATE 100 ms | SOFT | U_P7 | 5 min | 1kB | ¥0.8/MB |
| FAILURE DIAGNOSIS CLOUD APPLICATION | IMAGE | UL | IN 1 day | SOFT | U_P9 | 1 day | 30GB | ¥0.01/MB |
| | CAN | UL | REPETITION RATE 1 sec | SOFT | U_P7 | 5 min | 1kB | ¥1.6/MB |

FIG. 8

| | BEST EFFORT | | |
|---|---|---|---|
| REAL TIME PROPERTY | SOFT | | |
| PRIORITY CLASS | U_P3 | U_P7 | U_P9 |
| QUEUE | d32, d31 | d74, d73, d72, d71 | d91 |
| SERVICE ID | ROAD ENVIRONMENT ANOMALY DETECTION | ROAD ENVIRONMENT ANOMALY DETECTION | ROAD ENVIRONMENT ANOMALY DETECTION |
| DATA ID | IMAGE | CAN | IMAGE (SAVE) |
| SERVICE ID | | FAILURE DIAGNOSIS | |
| DATA ID | | CAN | |

FIG. 10

| SERVICE NAME (SERVICE ID) | DATA TYPE (DATA ID) | LINK | TRANSMISSION FREQUENCY | REAL TIME PROPERTY | PRIORITY CLASS | QoS | | DATA VALUE UNIT PRICE |
|---|---|---|---|---|---|---|---|---|
| | | | | | | TRANSMISSION DELAY | TRANSMISSION CAPACITY | |
| ROAD ENVIRONMENT ANOMALY DETECTION CLOUD APPLICATION | CAN | UL | REPETITION RATE 100 ms | SOFT | U_P7 | 5 min | 1kB | ¥0.8/MB |
| FAILURE DIAGNOSIS CLOUD APPLICATION | CAN | UL | REPETITION RATE 1 sec | SOFT | U_P7 | 5 min | 1kB | ¥1.6/MB |

FIG. 16

| | CONDITIONAL EXPRESSION: TRUE | CONDITIONAL EXPRESSION: FALSE |
|---|---|---|
| SET A ⊆ SET B<br><br>(SET A inside SET B)<br><br>[CONDITIONAL EXPRESSION f1<br>$V_a \leq V_j$] | TRANSMISSION DATA VALUE UNIT PRICE OF A∪B<br>$$V_{t(A+B)} = V_b + \frac{N_a V_a}{N_b}$$ | TRANSMISSION DATA VALUE UNIT PRICE OF A∩B<br>$$V_{t(A*B)} = V_a + V_b$$<br>TRANSMISSION DATA VALUE UNIT PRICE OF B−A<br>$$V_{t(B-A)} = V_b$$ |
| SET A ⊇ SET B<br><br>(SET B inside SET A)<br><br>[CONDITIONAL EXPRESSION f2<br>$V_b \leq V_j$] | TRANSMISSION DATA VALUE UNIT PRICE OF A∪B<br>$$V_{t(A+B)} = V_a + \frac{N_b V_b}{N_a}$$ | TRANSMISSION DATA VALUE UNIT PRICE OF A∩B<br>$$V_{t(A*B)} = V_a + V_b$$<br>TRANSMISSION DATA VALUE UNIT PRICE OF A−B<br>$$V_{t(A-B)} = V_a$$ |
| NO INCLUSION RELATION<br><br>(SET A and SET B overlap)<br><br>[CONDITIONAL EXPRESSION f3<br>$V_a \leq V_b$] | TRANSMISSION DATA VALUE UNIT PRICE OF B<br>$$V_{tB} = V_b + \frac{N_a V_a}{N_b}$$<br>TRANSMISSION DATA VALUE UNIT PRICE OF A−B<br>$$V_{t(A-B)} = V_a$$ | TRANSMISSION DATA VALUE UNIT PRICE OF A<br>$$V_{tA} = V_a + \frac{N_b V_b}{N_a}$$<br>TRANSMISSION DATA VALUE UNIT PRICE OF B−A<br>$$V_{t(B-A)} = V_b$$ |

RADIO COMMUNICATION TERMINAL

CROSS REFERENCE TO RELATED APPLICATION

The present application is based on Japanese patent application No. 2017-76039 filed on Apr. 6, 2017, the whole contents of which are incorporated herein by reference.

FIELD

The present disclosure relates to a radio communication terminal and, more particularly, to a technology for determining a data transmission order.

BACKGROUND

In JP 2004-140604A (US 2004/0082364 A1), a data packet is divided into a packet having a request value related to communication quality and a packet having no request value related to the communication quality so that the packet having a higher request value related to the communication quality is transmitted with priority. The communication quality includes, for example, a data transmission speed, a data transmission delay and jitter.

Among data having high request values related to the communication quality, some need not be transmitted with priority. For example, in case that a radio communication terminal is mounted in a vehicle and a road abnormality is detected based on an image captured by an in-vehicle camera, image data of the image captured at a location of the detected road abnormality need be transmitted quickly to a server or the like, which is provided for road management. The radio communication terminal, which transmits the image data of the location of the detected road abnormality, sets its request value related to the communication quality.

It is however sufficient for one radio communication terminal to transmit the image data of the location of the detected road abnormality. For this reason, once the radio communication terminal has transmitted the image data of the location of the detected road abnormality, it is not required for the radio communication terminal to transmit the same image data of the location of the detected road abnormality even though the request value related to the communication quality is high.

SUMMARY

It is therefore an object of the present disclosure to provide a radio communication terminal, which is capable of transmitting data of high transmission value with priority.

According to one aspect, a radio communication terminal comprises a data classification part, a data value unit price determination part, a transmission value unit price determination part, a transmission order control part, a resource allocation part and a transmission part. The data classification part is configured to acquire transmission data from a data supply source, classify the transmission data acquired form the data supply source by priority class based on a communication quality request, which is determined by types of the transmission data, and store the transmission data in a priority buffer in correspondence to the priority class. The data value unit price determination part is configured to determine a data value unit price of the transmission data stored in the priority buffer. The transmission value unit price determination part is configured to determine a transmission data value unit price based on the data value unit price determined by the data value unit price determination part. The transmission order control part is configured to assign a transmission order to the transmission data having the transmission data value unit price higher than a predetermined transmission threshold value, based on the priority class classified by the data classification part. The resource allocation part is configured to allocate a communication resource to the transmission data based on the transmission order determined by the transmission data control part. The transmission part configured to transmit the transmission data by the communication resource allocated by the resource allocation part.

BRIEF DESCRIPTION OF THE DRAWINGS

FIG. 3 is a chart showing priority classes in the first embodiment;

FIG. 4 is a chart showing a correspondence relation between a data type and data value unit price;

FIG. 8 is a chart showing a best effort part extracted from the chart shown in FIG. 3;

FIG. 10 is a chart showing a part extracted from the chart shown in FIG. 4;

FIG. 16 is a chart showing processing executed by a transmission value unit price determination part;

DETAILED DESCRIPTION OF THE EMBODIMENTS

Figure 1:
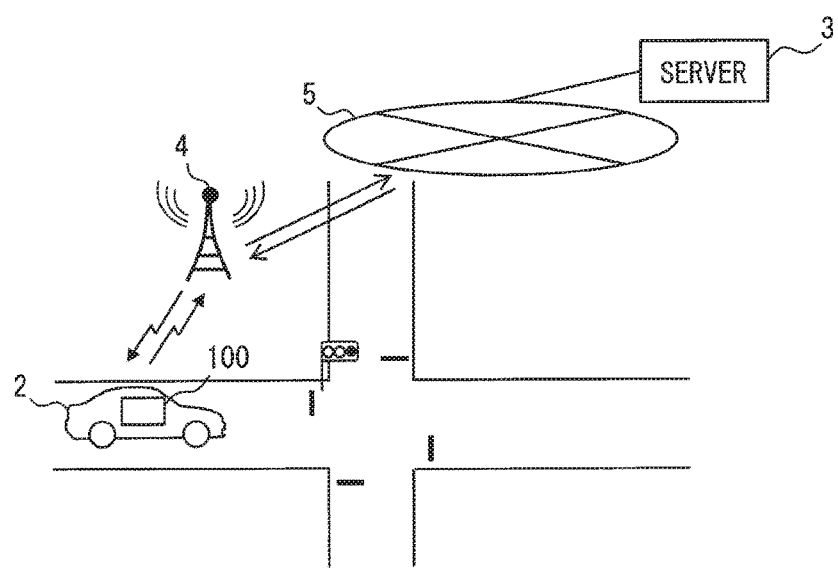
FIG. 1 is a diagram showing a radio communication system, in which a radio communication terminal is used.

Embodiments of a radio communication terminal will be described with reference to the drawings. Same or similar configurations and functions are designated with same or similar reference numerals in the embodiments described below for brevity of description.

<First Embodiment>

Referring first to FIG. 1, which shows a radio communication system, a radio communication terminal 100 is used in a vehicle 2, which is a mobile body, and movable with the vehicle 2. The radio communication terminal 100 is provided for communication of data with a server 3. The communication of data includes transmission and reception of data. The communication between the radio communication terminal 100 and the server 3 is performed via a base station 4 and a communication network 5. The data communication from the radio communication terminal 100 to the server 3 is an uplink transmission and the data communication from the server 3 to the radio communication terminal 100 is a downlink transmission.

[Configuration of Radio Communication Terminal 100]

Figure 2:
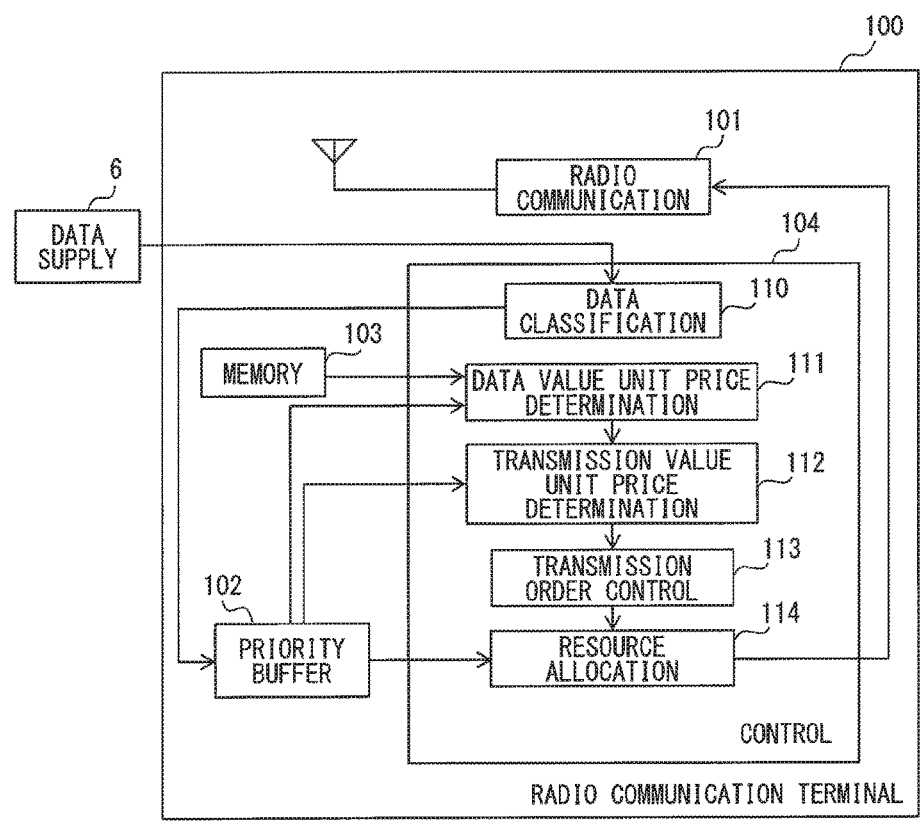
FIG. 2 is a block diagram showing a radio communication terminal according to a first embodiment.

The radio communication terminal 100 includes, as shown in FIG. 2, a radio communication part 101, a priority buffer 102, a memory part 103 and a control part 104. The radio communication part 101 performs signal transmission and reception via radio wave and communicates with the server 3 through the base station 4 and the communication network 5. A frequency of the radio wave, by which the radio communication part 101 performs signal transmission and reception, is not limited as far as it is permitted by regulation. A communication method is not limited to a particular communication method such as LTE, which is used in a mobile communication system, but may be a combination of dedicated short range communications such as LAN. The radio communication part 101 has a radio communication function and operates as a transmission part.

The priority buffer 102 temporarily stores data (transmission data), which the radio communication terminal 100 transmits. The priority buffer 102 is configured to store the transmission data for each of plural priority classes.

In the first embodiment, the priority class is determined based on a level of request related to real time property of the transmission data. The priority classes in the first embodiment are exemplarily shown in FIG. 3. In FIG. 3, as the priority classes, "control," "U_P1," "U_P3," "U_P7" and "U_P9" are shown. "Control" indicates a priority class (level of priority), which uses a control channel and is the highest in priority. In "U_P1," "U_P3," "U_P7" and "U_P9," "U" indicates an uplink and a number indicates a level of priority. A smaller number has a higher priority.

In FIG. 3, in a row above the priority class, request levels related to real time property, that is, requested levels of real time property are defined. "Hard" indicates that a serious problem will occur unless processing is executed before a deadline. "Firm" indicates that, although the serious problem will not occur even in case of no processing before the deadline, the processing executed after the deadline will have no value (zero) of processing.

"Soft" indicates that the serious problem will not occur even in case of no processing before the deadline and the processing executed after the deadline will not result in no value (zero) immediately but will result in a gradual decrease with a lapse of time.

In addition to the real time property "hard" corresponding to the priority class "control," there is also "unknown." "Unknown" is provided, because the real time property may be "hard" in case the real time property is not known.

The transmission data, the real time property of which is "hard" or "unknown" and the priority class of which is "control", is transmitted by way of a band reservation type communication method. The transmission data, the real time property of which is "firm" and the priority class of which is "U_P1," is transmitted by way of a band guarantee type communication method. The transmission data, the real time property of which is "soft," is transmitted by way of a best effort type communication method.

The real time property is defined based on whether the processing is executed before the deadline. Whether the processing is executed before the deadline depends on a transmission speed and a transmission delay of data. For this reason, a determination of the priority class in correspondence to the level of request related to the real time property of the transmission data results in a determination of the priority class based on a communication quality request determined by types of transmission data.

In FIG. 3, "service ID" is an ID of a service, which specifies processing to be executed by using the transmission data or the transmission request of the transmission data. "Data ID" is an ID, which specifies data necessary in the service specified by the service ID. For simplification, the service ID and the data ID are shown as words in FIG. 3. In practice, however, the service ID and the data ID are defined as a series of numbers of a combination of numbers and characters. In FIG. 3, the word indicated as the service ID means a type of service to be provided and the word indicated as the data ID means a type of transmission data.

"Query" is a request for transmission of transmission data. Since the query is not the transmission data, which corresponds to any one of data types, it is not assigned with the data ID. Since the query is not the transmission data itself, the real time property is defined as unknown because the transmission data is not known.

"Electronic coupling" is a control for coupling a following vehicle by electronic control. The transmission data for this is a control signal, which controls the following vehicle. "Remote monitor" is a service provided to monitor a monitor position, which is to be monitored, from a position distanced from the monitor position. The transmission data for this is an image data capturing an image of the monitor position.

"Road environment anomaly detection," the priority class of which is U_P3, is a service for detecting a road environment anomaly of the vehicle 2. The transmission data for this is an image data captured by an in-vehicle front camera when the road environment anomaly is detected. "Road environment anomaly detection," the priority class of which is U_P7, is a service for detecting the road environment anomaly of the vehicle 2. The transmission data for this is CAN data. CAN is a registered trademark. "Failure diagnosis" is a service for diagnosing a failure of the vehicle 2. The transmission data for this is also CAN data.

"Road environment anomaly detection," the priority class of which is U_P9, is also a service for detecting the road environment anomaly of the vehicle 2 and the same as the "road environment anomaly detection," the priority class of which is U_P3. The transmission data is the image data similarly to that of the U_P3. However, it is represented as "(SAVE)", which means that it is saved to be transmitted when the transmission is requested. The request level of the real time property is not high. For this reason, the priority class is defined to be low.

The memory part 103 is a non-volatile storage medium, which stores data in a form of data table as exemplarily shown in FIG. 4. Details of the table will be described later.

The control part 104 is a computer, which includes a CPU, a RAM, a ROM, and an I/O and bus lines connecting these structural parts. The ROM stores therein programs so that computer may operate as the control part 104. As far as the programs are stored in a non-transitory tangible storage medium, the storage medium is not limited to the ROM. For example, the programs may be stored in a flash memory. By execution of the programs, the CPU performs a method, which corresponds to a control program.

By execution of the programs stored in the ROM by the CPU, the control part 104 performs functions, which are shown as function blocks in FIG. 2. That is, the control part 104 includes, as the function blocks, a data classification part 110, a data value unit price determination part 111, a transmission value unit price determination part 112, a transmission order control part 113 and a resource allocation part 114.

A part or all of the function blocks provided in the control part 104 may be realized by using one or plural ICs (that is, hardware). A part or all of the function blocks of the control part 104 may be realized by a combination of software execution by the CPU and hardware parts. Thai is, the function blocks are configured to perform respective functions.

The control part 104 acquires the transmission data from a data supply part 6, which is provided in the vehicle 2, through an in-vehicle communication line. The data supply part 6 may include various sensors mounted in the vehicle 2. The sensors include a camera. An electronic control unit (ECU), which supplies control signals and CAN data, is also one example of the data supply part 6.

The data classification part 110 classifies the transmission data acquired from the data supply part 6 into corresponding priority classes and stores the classified data in the priority buffer 102 in correspondence to the priority classes. The priority class is determined based on the level of request related to the real time property of the transmission data. The correspondence relation between the type and the priority class of the transmission data is predetermined.

Among the transmission data stored in the priority buffer 102, the data value unit price determination part 111 determines the data value unit price of the transmission data, which has the real time property "soft" and hence is to be transmitted by way of the best effort type communication method. The data value unit price of the transmission data is defined as a data table as exemplarily shown in FIG. 4.

The data table shown in FIG. 4 defines the correspondence relation between "data type" and "data value unit price". In addition, the data table defines "service name," "communication link," "real time property," "priority class" and "service QoS." The service name and the data type are indicated by a service ID and a data ID, respectively. "Remote control cloud application" means an application, which executes a remote control of the vehicle 2. "Road environment anomaly detection cloud application" means an application, which detects an occurrence of abnormality in a travel of the vehicle 2 from an external side. The road environment anomaly detection shown in FIG. 3 indicates the road environment anomaly detection cloud application in a simplified manner. "Failure diagnosis cloud application" means an application, which detects a diagnosis whether the vehicle has a failure from the external side. The failure diagnosis shown in FIG. 3 indicates the failure diagnosis cloud application in a simplified manner.

"Transmission frequency" means a number of times of transmission of the transmission data. The real time property and the priority class are the same as those described with reference to FIG. 3. "QoS" means a request for the communication quality. In the example in FIG. 4, QoS is defined as a permissible value of the transmission delay and the transmission capacity.

"Data value unit price" is a price of a unit data amount. The data table shown in FIG. 4 may be predetermined. It may alternatively be defined by queries transmitted from the server or other radio communication terminals. The data value unit price may be varied by way of a predetermined operation of a user.

Among the data value unit prices shown in FIG. 4, the unit price of the image data, which the remote control cloud application requests, is the highest. The next highest data value unit price is the CAN data, which the failure diagnosis cloud application requests. The priority class of the CAN data is U_P7 and lower than the priority class U_P3 of the image data, which the road environment anomaly detection cloud application requests. However, the data value unit price of the CAN data, which the failure diagnosis cloud application requests, is higher.

The transmission value unit price determination part 112 determines the data value unit price, which is determined by the data value unit price determination part 111, to be the transmission data value unit price without any charge. The transmission data value unit price is compared with a transmission threshold value TH by the transmission order control part 113 and is used as a value for checking whether the transmission data is worthy of transmission.

The transmission order control part 113 sets the transmission data, the transmission data value unit price of which determined by the transmission value unit price determination part 112 is equal to or higher than the predetermined transmission threshold value TH, to be a target for assigning a transmission order. Thus, even in case that the transmission data has the higher priority class, the transmission order is not assigned to such transmission data, the data value unit price of which is lower than the transmission threshold value TH. As a result, even in case that the priority class is low, the transmission data having higher transmission data value unit price is transmitted with priority.

The resource allocation part 114 first allocates a communication resource to the transmission data, which is transmitted by way of the band reservation type or band guarantee type communication method, among the transmission data stored in the priority buffer 102. The resource allocation part 114 then allocates the communication resource to the communication data, which is transmitted by way of the best effort type communication method. The resource allocation part 114 allocates, however, the communication resource to the transmission data, which is transmitted by way of the best effort type communication method, in the order from the higher transmission order assigned by the transmission order control part 113. After assignment of the transmission order, the communication resource may be allocated by using various conventional processing. The communication resource includes at least one of a frequency band and a time slot.

[Flowchart]

Figure 5:
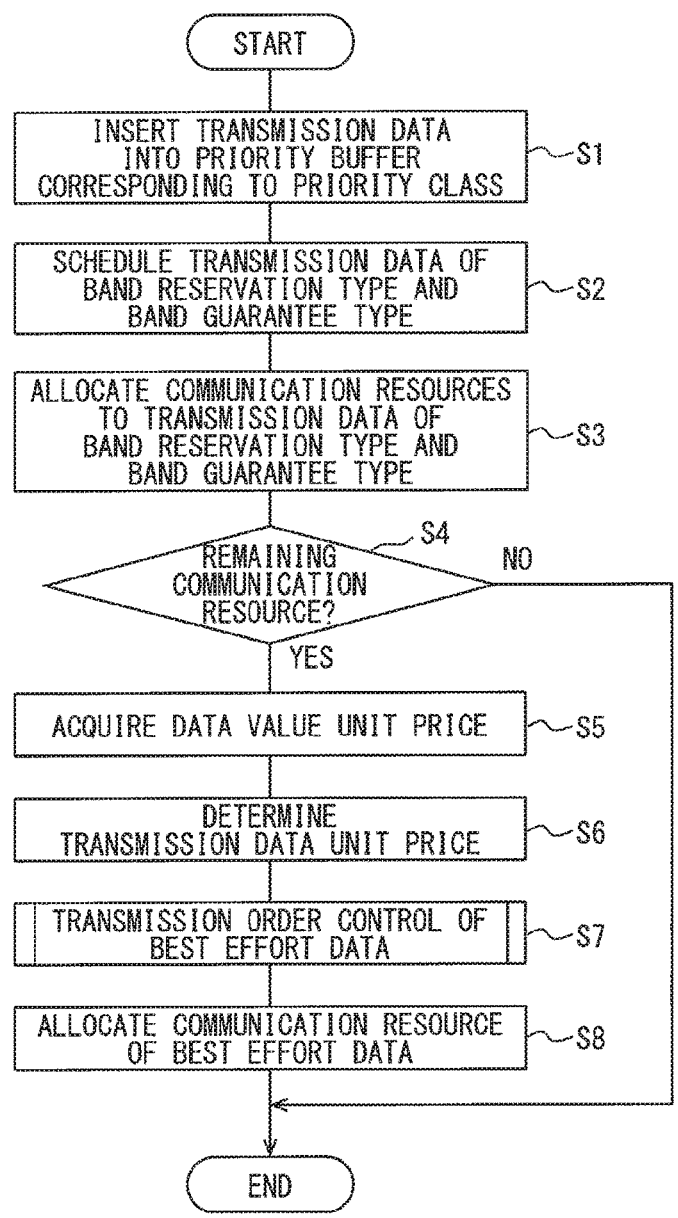
FIG. 5 is a flowchart showing processing executed by a control part in the first embodiment.

In the first embodiment, the control part 104 executes software processing shown as a flowchart in FIG. 5. In the following description, however, processing of each step (abbreviated as S) executed as software by the computer are assumed to be executed by the corresponding function parts shown in FIG. 1. The processing shown in FIG. 5 is started, when the data classification part 110 acquires the transmission data. At step S1, the data classification part 110 inserts the transmission data in the priority buffer 102 in correspondence to each priority class.

At S2, the transmission order control part 113 schedules the transmission data, which is transmitted by way of the band reservation type method or the band guarantee type method. The scheduling may be made by using conventional scheduling methods such as PQ (priority queuing), CBQ (class-based queuing) and WRR (weighted round-robin).

At S3, the resource allocation part 114 extracts the transmission data from the priority buffer 102 in the order of transmission determined at S2 and allocates the communication resources. The transmission data, to which the communication resource is allocated, is transmitted from the radio communication part 101 by using the allocated communication resource.

At S4, the resource allocation part 114 checks whether any communication resource remains. In case a check result of S4 is NO, the processing shown in FIG. 5 is finished. In case the check result of S4 is YES, S5 is executed.

At S5, the data value unit price determination part 111 acquires the data value unit price relative to the transmission data of the best effort type stored in the priority buffer 102 from the data table stored in the memory part 103.

At S6, the transmission value unit price determination part 112 determines the transmission data value unit price. In the first embodiment, the data value unit price itself acquired at S5 is used as the transmission data value unit price.

At S7, the transmission order control part 113 determines the transmission order of the best effort data stored in the priority buffer 102 in correspondence to the transmission data value unit price determined at S6. The best effort data is the transmission data to be transmitted by way of the best effort type transmission method. Processing at S7 is shown in detail in FIG. 6.

Figure 6:
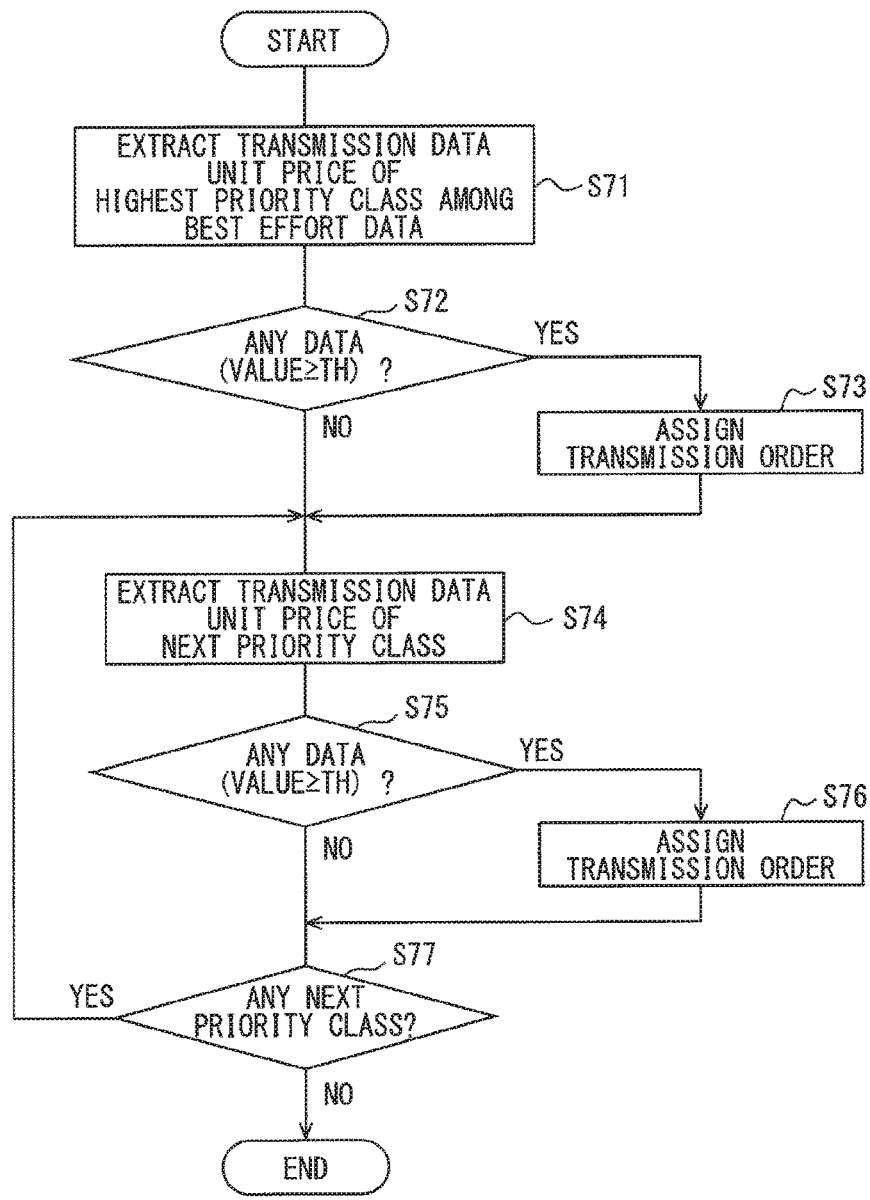
FIG. 6 is a flowchart showing details of a part of processing shown in FIG. 5.

In FIG. 6, at S71, the transmission data value unit price of the transmission data, which is in the highest priority class among the best effort type transmission data, is extracted. At S72, it is checked whether there is any transmission data, the transmission data value unit price of which is equal to or higher than the transmission threshold value TH, among the transmission data of the highest priority class in the best effort type transmission data. In case that a check result at S72 is YES, S73 is executed.

At S73, the transmission order is assigned to the transmission data, the transmission data value unit price of which is equal to or higher than the transmission threshold value TH among the transmission data of the highest priority class. The transmission order may be determined by using the conventional scheduling methods similarly to S2.

In case that the check result at S72 is NO or S73 is executed, S74 is executed. At S74, the transmission data value unit price of the transmission data, which is in the next priority class, is extracted. At S75, it is checked whether there is any transmission data value unit price extracted at S74, the transmission data value unit price of which is equal to or higher than the transmission threshold value TH. In case that this check result is YES, S76 is executed.

At S76, similarly to S73, the transmission order is assigned to the transmission data having the transmission data value unit price equal to or higher than the transmission threshold value TH among the transmission data, the transmission data value unit price of which is extracted at S74. In case that the check result at S75 is NO or S76 is executed, S77 is executed.

At S77, it is checked whether there is any transmission data of further lower priority class among the transmission data stored in the priority buffer 102. In case that this check result is YES, S74 is executed again. In case that this check result is NO, the processing of FIG. 6 is finished.

One example of application of the processing shown in FIG. 6 will be described with reference to FIG. 3. In FIG. 3, plural queues divided based on the priority class are shown. Each queue is a part of elements of the priority buffer 102. In the queue of the priority class U_P3, two sets of transmission data d31 and d32 are included. In the queue of the priority class U_P7, four sets of transmission data d71, d72, d73 and d74 are included. In the queue of the priority class U_P9, one set of transmission data d91 is included. It is assumed here that, among these sets of transmission data, the transmission data value unit prices of the transmission data d71 and d72 are higher than the transmission threshold value TH and the transmission data value unit prices of the remaining transmission data are not higher than the transmission threshold value TH.

In this situation, even in case that the priority class is U_P3, the transmission order is not assigned to the transmission data d31 and d32. However, the transmission order is assigned to the transmission data d71 and d72, the priority classes of which are U_P7.

Referring to FIG. 5 again, at S8, the resource allocation part 114 allocates the communication resource to the transmission data, which is to be transmitted by way of the best effort type communication method assigned with the transmission order at S7.

[Feature of First Embodiment]

In the first embodiment described above, for the transmission data stored in the priority buffer 102 and transmitted by way of the best effort type transmission method, the data value unit price is determined (S5) in addition to the priority class determined in correspondence to the type of transmission data and the determined data value unit price is determined as the transmission data value unit price (S6). The transmission data having the transmission data value unit price, which is equal to or higher than the transmission threshold value TH, is selected as the target for assigning the transmission order and the transmission order is assigned based on the priority class (S7).

Even in case that the priority class is high, the transmission order is not assigned to the transmission data, the transmission data value unit price of which is low. As a result, the transmission data having high value of transmission is transmitted with priority.

<Second Embodiment>

Figure 7:
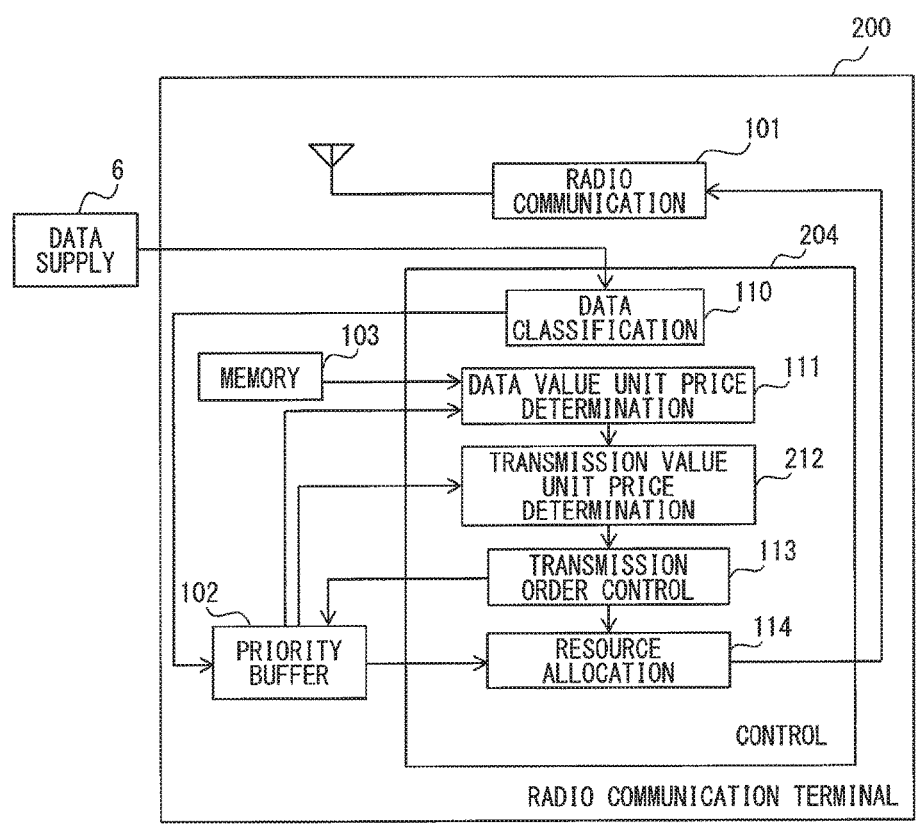
FIG. 7 is a block diagram showing a radio communication terminal according to a second embodiment.

In a second embodiment, as shown in FIG. 7 and FIG. 8, a control part 204 of a radio communication terminal 200 includes a transmission value unit price determination part 212. A function of the transmission value unit price determination part 212 is different from that of the transmission value unit price determination part 112 of the first embodiment. In case that the priority buffer 102 includes the same transmission data in the same priority class, the transmission value unit price determination part 212 sets the transmission data value unit price by adding the data value unit price of the same transmission data.

Here, the same transmission data means the data, the data types of which are the same. FIG. 8 is a data table showing only the best effort part from the data table shown in FIG. 3. In FIG. 8, the priority class U_P7 includes transmission data, the service IDs of which are different but the data types of which are the same. Specifically, in FIG. 8, the transmission data of the road environment anomaly detection service and the failure diagnosis service are both CAN data.

As shown in FIG. 4, the data unit price of the CAN data of the road environment anomaly detection cloud application is ¥0.8/M8 (0.8 Japanese yen per MB). The data value unit price of the CAN data of the failure diagnosis cloud application is ¥1.6/MB. These data are of the same priority class and the same data type. Accordingly, in the second embodiment, the transmission data value unit price is determined by adding those two data value unit prices. The transmission data value unit price of the CAN data of the priority class U_P7 is thus calculated to be ¥2.4/MB.

In case that the transmission data value unit price is calculated by addition of plural data value unit prices, each transmission data corresponding to each of added plural data value unit prices is handled and transmitted as one transmission data and not as individual transmission data. It is accordingly possible to reduce an amount of the transmission data (transmission data amount).

According to the second embodiment, it is made possible to transmit the transmission data of low priority class in case that such a low priority class includes the transmission data of the same data type. In case that the transmission data value unit price is determined by addition of plural data value unit prices, the transmission data of such a transmission data value unit price determined by addition is desired to be transmitted with priority over the transmission data of higher priority class. In this case, the transmission threshold value TH may be set to be higher than that of the data value unit price of the transmission data, which belongs to the higher priority class.

<Third Embodiment>

Figure 9:
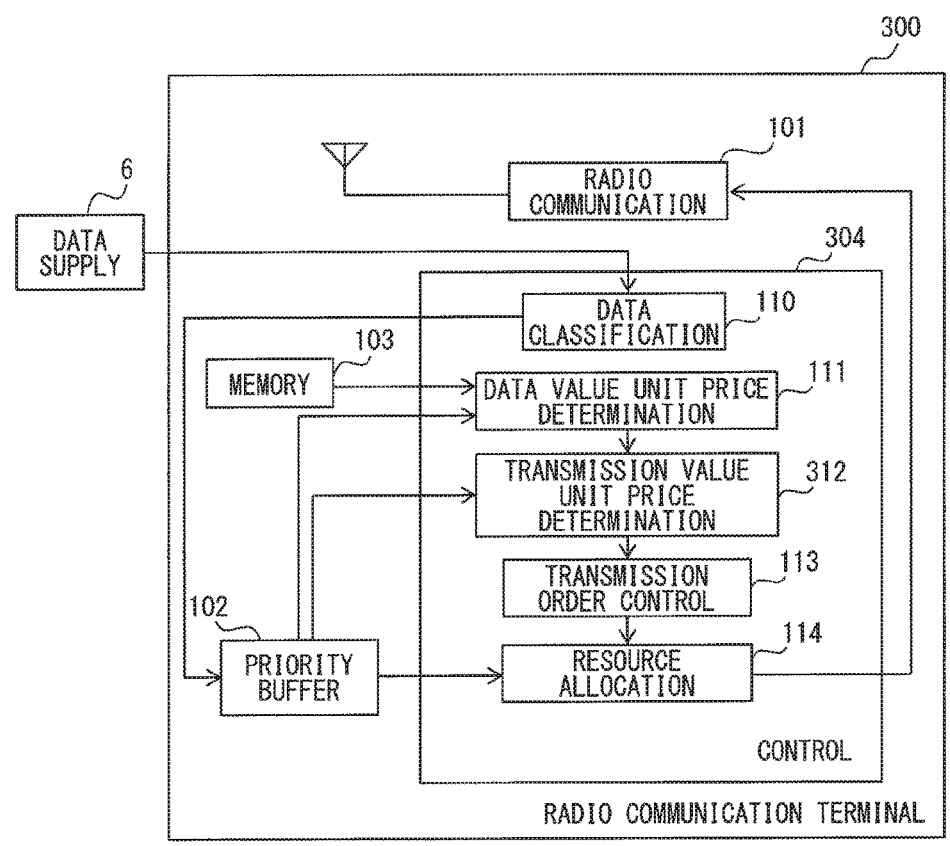
FIG. 9 is a block diagram showing a radio communication terminal according to a third embodiment.

In a third embodiment, as shown in FIG. 9, a control part 304 of a radio communication terminal 300 includes a transmission value unit price determination part 312. A function of the transmission value unit price determination part 312 is different from that of the transmission value unit price determination part 212 of the second embodiment. In the second embodiment, the transmission value unit price determination part 212 adds the data value unit prices in case that the priority classes are the same and the types of the transmission data are the same.

In case that the priority classes are the same and the transmission data types are the same, the transmission value unit price determination part 312 sets the transmission data value unit price by adding the data value unit prices of the individual transmission data by handling each transmission data individually.

Processing of the transmission value unit price determination part 312 according to the third embodiment will be described with reference to FIG. 10 and FIG. 11. FIG. 10 shows a part of the data map shown in FIG. 4. As shown in FIG. 10, the transmission data of the travel detection cloud application and the failure diagnosis cloud application are both CAN data. However, a transmission frequency of the travel detection cloud application is 100 millisecond (ms) period and a transmission frequency of the failure diagnosis cloud application is 1 second (s) period.

Figure 11:
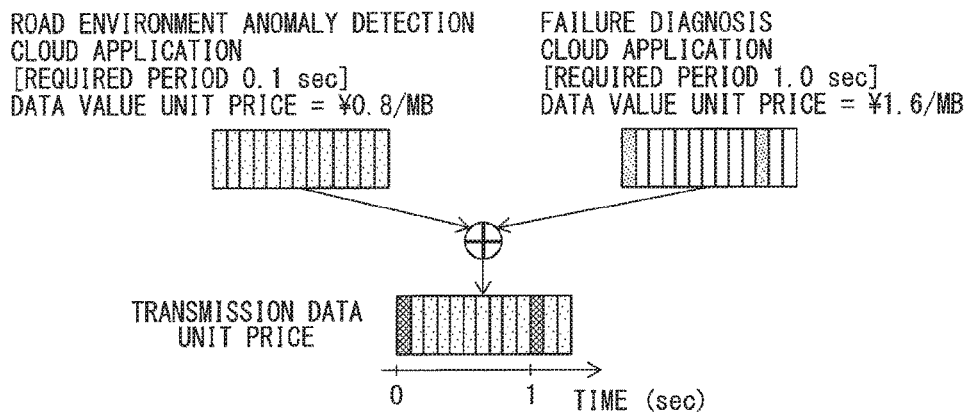
FIG. 11 is a chart showing a determination of a transmission data value unit price by adding data value unit prices.

The transmission data value unit price, which the transmission value unit price determination part 312 determines in the example of FIG. 10, is shown in FIG. 11. As shown in FIG. 11, the transmission data value unit price is determined by adding the data value unit price of the CAN data of the road environment anomaly detection cloud application and the data value unit price of the CAN data of the failure diagnosis cloud application. In FIG. 11, darkness of the transmission data value unit price indicates a level of the value unit price.

The transmission types of the road environment anomaly detection cloud application and the failure diagnosis cloud application are both CAN data and the priority classes of these two applications are both U_P7. However, the transmission time points overlap at every 1 second. As a result, the transmission data value unit price increases at every interval of 1 second. The transmission data value unit price at this time is 0.8+1.6-2.4 (¥/MB). At other time points, the failure diagnosis cloud application does not transmit the transmission data. For this reason, the transmission data value unit prices at the other time points are the same, that is, 0.8 (¥/MB), as the data value unit price determined by the road environment anomaly detection cloud application.

In case of determination of the transmission data value unit price by addition of the data value unit prices, the determined transmission data value unit price is likely to exceed transmission threshold value TH. As a result, the transmission data, the transmission data value unit price of which is determined by addition of the data value unit prices, is likely to be transmitted with priority as shown in FIG. 12 and FIG. 13.

Figure 12:
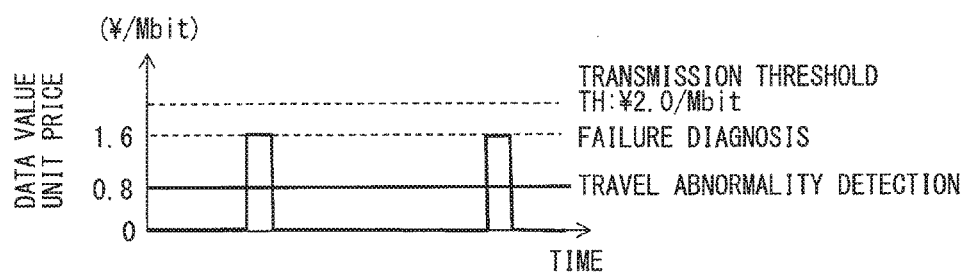
FIG. 12 is a chart showing a data value unit price in comparison with a transmission threshold value TH.

FIG. 12 shows the data value unit price of the CAN data of the road environment anomaly detection cloud application and the data value unit price of the failure diagnosis cloud application in comparison with the transmission threshold value TH. As shown in FIG. 12, the data value unit prices of the CAN data of both road environment anomaly detection cloud application and the failure diagnosis cloud application do not exceed the transmission threshold value TH. For this reason, no transmission order is assigned to the CAN data based on the comparison with the transmission threshold value TH.

Figure 13:
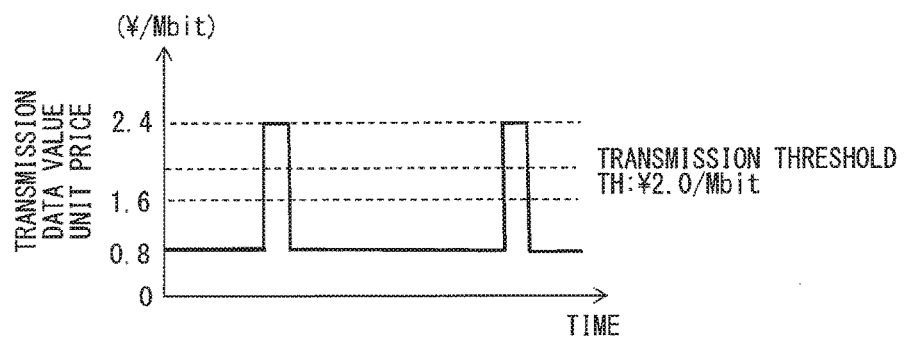
FIG. 13 is a chart showing a case that a transmission data value unit price exceeds the transmission threshold value.

However, as shown in FIG. 13, the transmission data value unit prices both exceed the transmission threshold value TH by addition of the data value unit prices. Accordingly, the transmission order is assigned to the transmission data, the transmission data value unit price of which is determined by addition of the data value unit price.

<Fourth Embodiment>

Figure 14:
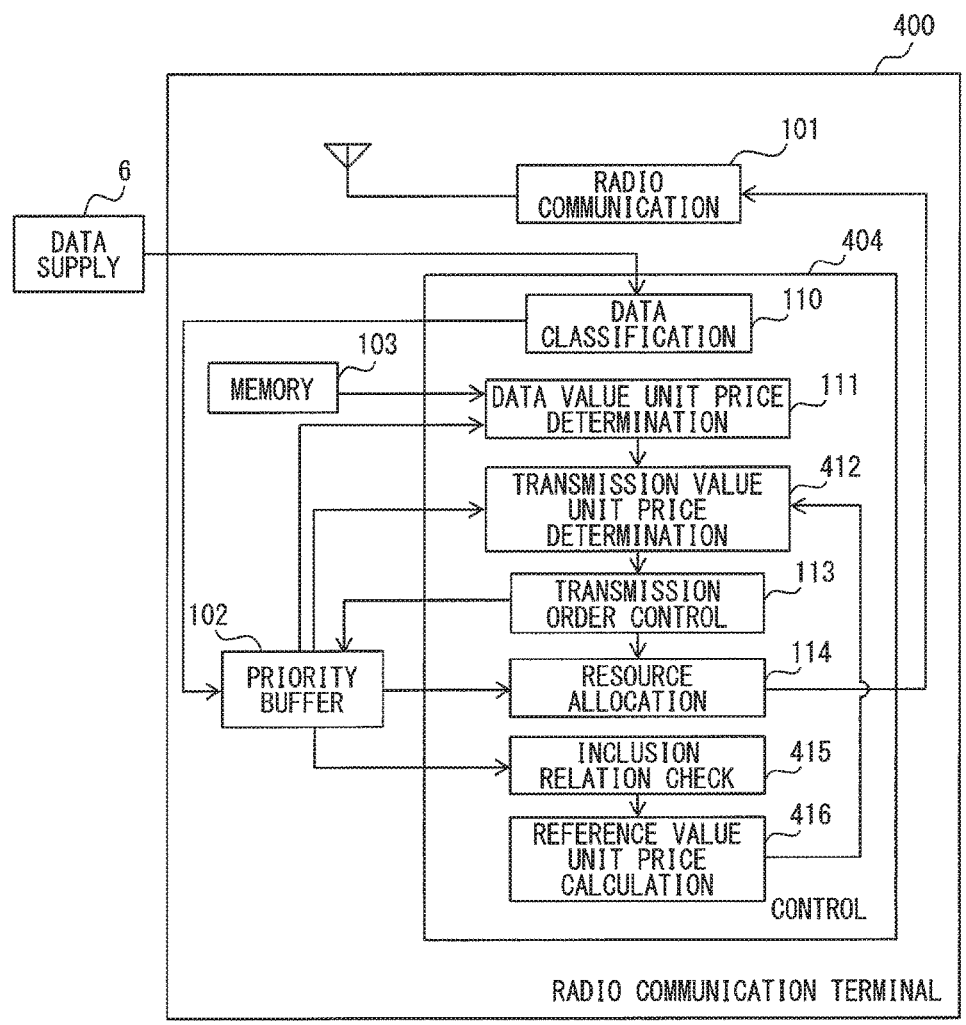
FIG. 14 is a block diagram showing a radio communication terminal according to a fourth embodiment.

In a fourth embodiment, as shown in FIG. 14, a control part 404 of a radio communication terminal 400 includes a transmission value unit price determination part 412, an inclusion relation check part 415 and a reference value unit price calculation part 416. Processing of the transmission value unit price determination part 412 is different from those of the foregoing embodiments.

In case that there are two sets of transmission data of the same type in the same priority class of the priority buffer 102, the inclusion relation check part 415 checks whether there is a product set between the two sets of the transmission data. In case there is the product set, the inclusion relation check part 415 further checks whether the product set is a subset or a set of no inclusion relation.

More details will be described below. In the third embodiment described above, for example, the CAN data at one transmission time point is handled as one data irrespective of the number of data included in the CAN data at that transmission time point. In the fourth embodiment, however, each of the plural data included in the CAN data is handled individually in case that the CAN data includes plural data at the transmission time point. In the following description, those plural data are distinguished with CAN_ID.

It is assumed that the CAN data, which the road environment anomaly detection cloud application needs, are CAN_ID=1, 2, 3 and 4. It is also assumed that the CAN data, which the failure diagnosis cloud application needs, are CAN_ID=1, 2, 3, 4 through 19 and 20. In this example, the product set is {CAN_ID: 1, 2, 3 and 4}.

These correspond to the set of the transmission data of the same type, since all are CAN data. These CAN data are the transmission data of the same priority class, that is, U_P7. It is therefore checked whether there is the product set between the CAN data, which the road environment anomaly detection cloud application, and the CAN data, which the failure diagnosis cloud application needs.

Figure 15:
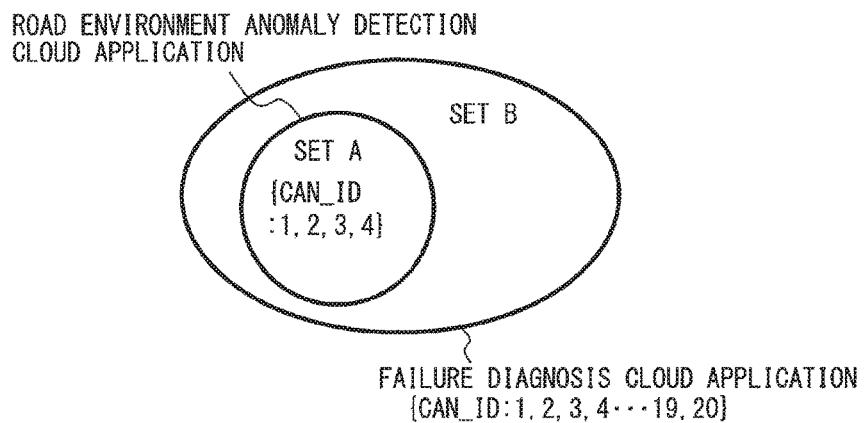
FIG. 15 is a chart showing two sets, which are in an inclusion relation.

FIG. 15 shows this detailed example in a Venn diagram form. In case of this example, as shown in FIG. 15, the CAN data, which the road environment anomaly detection cloud application, is a subset of the CAN data, which the failure diagnosis cloud application needs. In FIG. 15 and the following description, the set of CAN data of the road environment anomaly detection cloud application is designated as a set A and the set of CAN data of the failure diagnosis cloud application is designated as a set B.

Since the subset is one example of the product set, a product set exists between the CAN data, which the road environment anomaly detection cloud application needs, and the CAN data, which the failure diagnosis cloud application needs.

In case that the inclusion relation check part 415 determines that there exists the subset, the reference value unit price calculation part 416 calculates a reference value unit price Vj. The reference value unit price Vj is provided for use in checking whether the two transmission data sharing the product set need be divided.

The reference value unit price Vj is expressed as the following equation (1). In equation (1), Na and Nb indicate the numbers of data of first transmission data and second transmission data, respectively. The first transmission data and the second transmission data are two transmission data, which share the product set. In the detailed example described above, the first transmission data is the CAN data of the road environment anomaly detection cloud application, that is, set A, and the second transmission data is the CAN data of the failure diagnosis cloud application, that is, set B. In the equation (1), Va is a data value unit price of the first transmission data and Vb is a data value unit price of the second transmission data. Further, "n" is "a" or "b."

$$Vj=(Na \times Va + Nb \times Vb)/(\max Nn) \quad (1)$$

In the equation (1), a first term in a numerator is a data value relative to the set A, which is the subset, and a product of the data value unit price Va of the set A and the number of data Na of the set A. A second term in the numerator is a data value relative to the set B, which is a superset relative to the subset, and a product of the data value unit price Vb of the set B and the number of data Nb of the set B. For this reason, the equation (1) indicates a division of a sum of the data value of the subset and the data value of the super set by the number of data of the super set.

The transmission value unit price determination part 412 checks whether a conditional expression shown in FIG. 16 holds, That is, in case of determination that there is the subset, the transmission value unit price determination part 412 checks whether the conditional equations f1 and f2 hold.

The conditional equation f1 is for checking whether the data value unit price Va of the set A, which is the subset, is equal to or smaller than the reference value unit price Vj. In case that the conditional equation f1 is true (YES), the transmission data value unit price Vt(A+B) of a sum set of the set A and set B is calculated as Vb+(Na/Nb)×Va as shown in FIG. 16. In this case, the sum set of the set A and set B, which is a union of the set A and the set B, is handled as one transmission data.

In case that the conditional equation f1 is false (NO), the transmission data value unit price is determined by dividing the transmission data into two transmission data, one of which is transmission data belonging to both of the set A and the set B and the other of which is transmission data belonging to only the set B. The transmission data value unit price of the transmission data belonging to both of the set A and the set B is determined to be a sum of the data value unit price Va of the set A and the data value unit price Vb of the set B. The transmission data value unit price of the transmission data of the set B, which do not belong to the set A, is determined to be the data value unit price Vb of the set B.

The conditional equation f2 is for checking whether the data value unit price Vb of the set B, which is the subset, is equal to or smaller than the reference value unit price Vj. In case that the conditional equation f2 is TRUE, the transmission data value unit price Vt×(A+B) of the sum set of the set A and the set B is calculated as Va+(Nb/Na)×Vb as shown in FIG. 16. In this case, the sum set of the set A and set B is handled as one transmission data.

In case that the conditional equation f2 is false, the transmission data value unit price is determined by dividing the transmission data into two transmission data, one of which is the transmission data belonging to both of the set A and the set B and the other of which is the transmission data belonging to only the set B. The transmission data value unit price of the transmission data belonging to both of the set A and the set B is determined to be the sum of the data value unit price Va of the set A and the data value unit price Vb of the set B. The transmission data value unit price of the transmission data of the set A, which do not belong to the set B, is determined to be the data value unit price Va of the set A.

In case that the inclusion relation check part 415 determines that there is no inclusion relation, the transmission value unit price determination part 412 checks whether a conditional equation f3 holds. The conditional equation f3 indicates that the data value unit price Va of the set A is equal to or smaller than the data value unit price Vb of the set B.

In case that the conditional equation f3 is true, the transmission data value unit price Vt is determined by dividing the transmission data into the transmission data of the set B and the transmission data of the set A, which do not belong to the set B. The transmission data value unit price VtB of the set B is determined as Vb+(Na/Nb)×Va, as shown in FIG. 16. The transmission data value unit price Vt×(A−B) of the transmission data of the set A, which do not belong to the set B, is determined to be the data value unit price Va of the set A.

In case that the conditional equation f3 is false, the transmission data value unit price Vt is determined by dividing the transmission data into two transmission data, one of which is the transmission data belonging to the set A and the other of which is the transmission data belonging to the set B but not belong to the set A. The transmission data value unit price VtA of the transmission data of the set A is calculated as Va+(Nb/Na)×Vb. The transmission data value unit price Vt(B−A) of the transmission data of the set A, which do not belong to the set B, is determined to be the data value unit price Vb of the set B.

Figure 17:
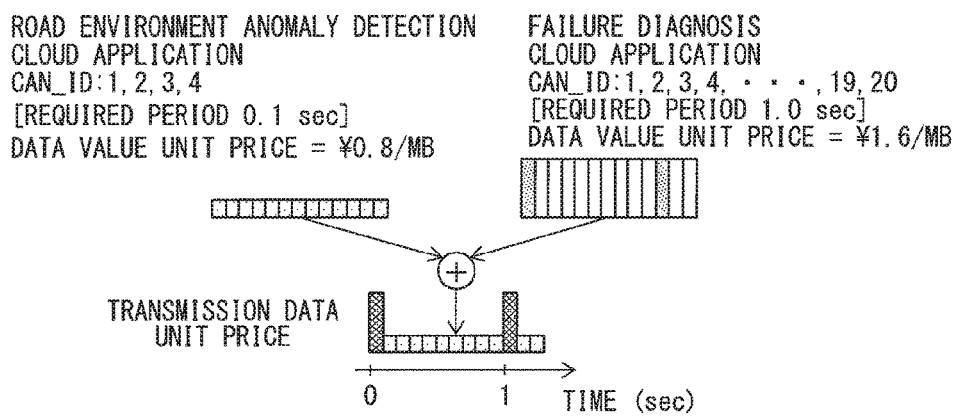
FIG. 17 is a chart showing one detailed example of determination of a transmission data value unit price determined by the transmission value unit price determination part.

A detailed example of the transmission data value unit price, which the transmission value unit price determination part 412 determines, will be described with reference to FIG. 17. FIG. 17 shows that the transmission data value unit price is determined by adding the data value unit price of the CAN data of the road environment anomaly detection cloud application and the data value unit price of the CAN data of the failure diagnosis cloud application.

In FIG. 17, each rectangle indicates a set of the transmission data, that is, set A or set B. The darkness of the rectangle indicates a level of the data value unit price and the length of the rectangle in the longitudinal direction indicates a data amount.

In the example of FIG. 17, the transmission data value unit price determined by addition of the data value unit prices is 1.6+(4/20)×0.8=1.76 (¥/MB). By comparing the transmission data value unit price with the transmission threshold value TH, it is determined whether the transmission order is to be assigned.

For a time point when the failure diagnosis cloud application does not request the CAN data, the CAN data for the failure diagnosis cloud application is not stored in the priority buffer. Thus, the transmission data value unit price at this time point is the data value unit price of the CAN data of the road environment anomaly detection cloud application, that is, 0.8 (¥/MB).

Although not shown in FIG. 17, in case that two types of transmission data value unit prices are calculated in FIG. 16, the transmission data is divided into sets, which correspond to the two types of transmission data value unit prices, and the transmission order is assigned to the divided transmission data as one transmission unit.

<Fifth Embodiment>

Figure 18:
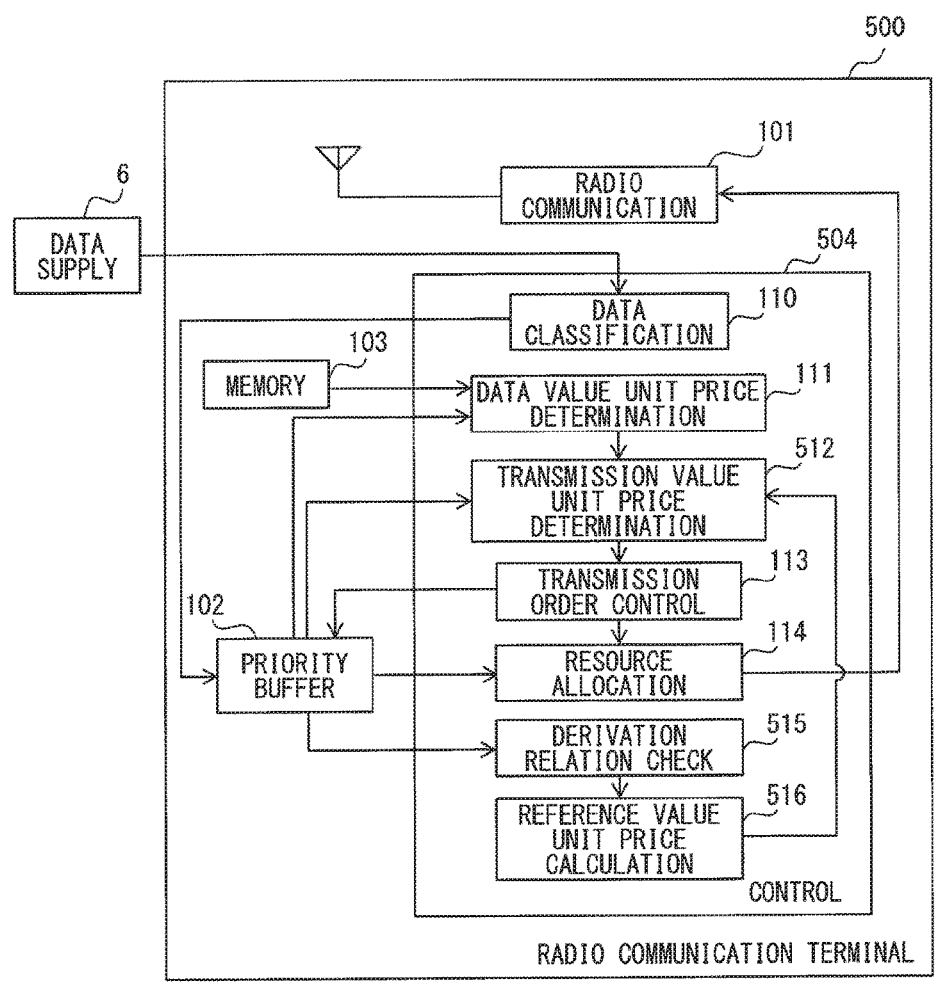
FIG. 18 is a block diagram showing a radio communication terminal according to a fifth embodiment.

In a fifth embodiment, as shown in FIG. 18, a control part 504 of a radio communication terminal 500 includes a transmission value unit price determination part 512, a derivation relation check part 515 and a reference value unit price calculation part 516. Processing of the transmission value unit price determination part 512 is different from that of the foregoing embodiments.

In case that there are two sets of transmission data of the same type in the same priority class of the priority buffer 102, the derivation relation check part 515 checks whether there is a derivation relation between the two sets of the transmission data.

The derivation relation means a relation between two sets of transmission data, that is, first transmission data and second transmission data, in which the first transmission data is a source of derivation and the second transmission data is derived as a result of derivation by abstracting the first transmission data.

Figure 19:
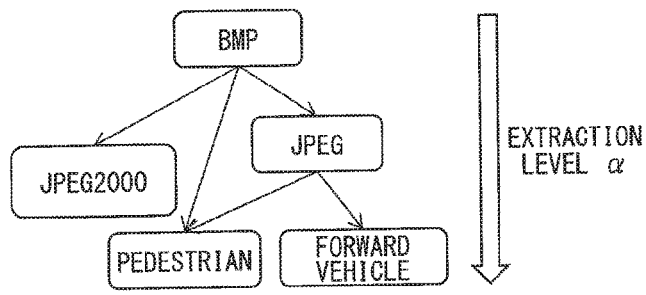
FIG. 19 is a chart showing a derivation relation.

More details will be described below. FIG. 19 shows one example of the derivation relation. BMP, JPEG and JPEG 2000 are image formats. Image data of JPEG and JPEG 2000 are formed from BMR As a result, the BMP data correspond to derivation source data, that is, the first transmission data and JPEG and JPEG 2000 are derivable as the second transmission data from the first transmission data.

It is possible to detect a pedestrian in a picture image by analyzing the BMP image data. It is similarly possible to detect a pedestrian and a forward vehicle in the picture image by analyzing the JPEG image data including the pedestrian and the forward vehicle. That is, the image data and an object, which is detected by the image analysis, are in a derivation relation. In this case, the first transmission data is the image data and the second transmission data is a name of the object, which is detected by the image analysis.

It is also possible to use the whole image data as the first transmission data and a part of the image data including the object as the second transmission data.

The derivation relation, which defines what data is derivable from what types of transmission data as the derivation source data, is stored in a non-volatile storage medium such as the memory part 103.

As shown in FIG. 19, deriving the data as the derivation destination from the data of the derivation source means abstraction of data. For this reason, the derivation relation is a relation of abstraction.

This level of abstraction is referred to as an abstraction level α. For example, in case that a data compression ratio of JPEG data is 20%, the abstraction level α is 0.2. The data compression ratio is a ratio of data size after compression relative to the data size before compression.

In case that the derivation relation check part 515 determines that there is the derivation relation, the reference value unit price calculation part 516 calculates the reference value unit price Vj. The reference value unit price Vj is calculated as follows.

$$Vj = Va + \alpha \times Vb \quad (2)$$

The equation (2) is substantially the same as the equation described in the fourth embodiment. In the fifth embodiment, in consideration of the equation (1), it corresponds to a comparison of the size of the transmission data of the derivation source and the size of the derived transmission data. Since a maximum value of the abstraction level α is 1, the transmission data of the derivation source is 1. For this reason, in the fifth embodiment, the denominator of the equation (1) is 1.

Similarly, Na is also 1. Nb is α. Thus, the equation (2) is derived. As described above, the equation (2) is substantially the same as the equation (1).

The transmission value unit price determination part 512 checks whether a conditional equation defined as equation (3) holds. The conditional equation (3) is the same as the conditional equation f2. The equation (3) defines a relation used to check whether the data value unit price Vb of the set B, which is the transmission data of the derivation source, is equal to or smaller than the reference value unit price Vj.

$$Vb \leq Vj \quad (3)$$

Equation (4) is derived by substituting the equation (2) for the equation (3) and rearranging the equation (3), $$Va \geq (1-\alpha) \times Vb \quad (4)$$

In case that the conditional equation (4) is true, the transmission data value unit price Vt×(A+B) of the sum set of the set A and the set B is calculated by Va+α×Vb. Va+α×Vb is the equation rearranged with Nb=α and Na=1 in the equation for calculating the data value unit price, which is used when the conditional equation f2 is true. In the fifth embodiment, the set of the sum of the set A and the set B is the transmission data of the derivation source.

In case that the conditional equation (4) is false, the transmission data value unit price is determined by dividing the transmission data into two transmission data, one of which belongs to both of the set A and the set B and the other of which belongs to only the set B.

The transmission data value unit prices of these transmission data are the same as in the case that the conditional equation f2 is false in FIG. 16. That is, the transmission data value unit price of the transmission data, which belong to both of the set A and the set B, is determined to be the sum of the data value unit price Va of the set A and the data value unit price Vb of the set B. This value is used as the transmission data value unit price of the transmission data of the derivation source. The transmission data value unit price of the transmission data of the set A, which does not belong to the set B, is determined to be the data value unit price Va of the set A. This value is used as the transmission data value unit price of the transmission data of the derivation destination.

Figure 20:
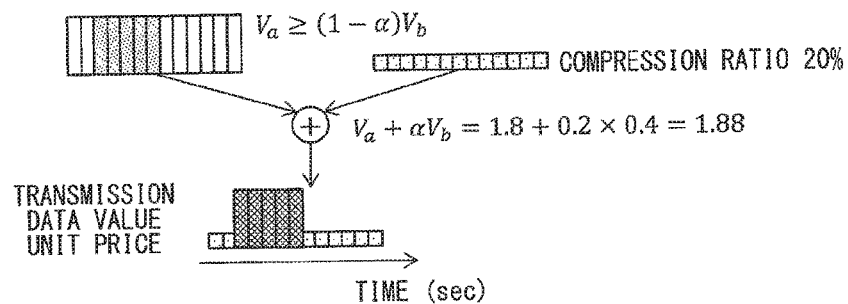
FIG. 20 is a chart showing one detailed example of determination of a transmission data value unit price by addition of the transmission data value unit prices.

FIG. 20 shows a detailed example of determination of the transmission data value unit price by addition of the data value unit prices. In FIG. 20, two services are shown. A service name of one of two services is a fixed point monitor. The image format is BMP. The request period (that is, data transmission period) is 0.0033 seconds. A location of a picture is at a specified road crossing. The data value unit price is ¥1.8/MB. This is the first transmission data.

A service name of the other of two services is the road environment anomaly detection. The image format is JPEG. The request period is 0.0033 seconds. The data value unit price is ¥0.4/MB. This is the second transmission data.

In this example, the conditional equation (4) holds. For this reason, the transmission data value unit price is determined as one set of the transmission data without dividing two transmission data. In the example of FIG. 20, the road environment anomaly detection service needs the transmission data continuously. However, although the request period of the fixed point monitor service is the same as that of the road environment anomaly detection service, the time point, at which the fixed point monitor service needs the transmission data, is a part of the time point, at which the road environment anomaly detection service needs the transmission data.

At the time point of transmission of the BMP data, only the BMP data is transmitted because the JPEG data is derived in case of transmission of the BMP data. Since the JPEG data is not transmitted, the amount of the transmission data is reduced.

The transmission data value unit price of the BMP data is calculated by the equation (2). Specifically, the unit price is calculated as 1.8+0.2×0.4=1.88 (¥/MB). Since the BMP data includes the value of the JPEG data, the transmission data value unit price becomes higher than the data value unit price of the BMP data. Since the transmission data value unit price of the BNP data becomes higher, the BMP data is transmitted with priority.

<Sixth Embodiment>

In the foregoing embodiments, the data value unit price is a fixed value. In a sixth embodiment, the data value unit price is searched by using a device state as a search key.

Figure 21:
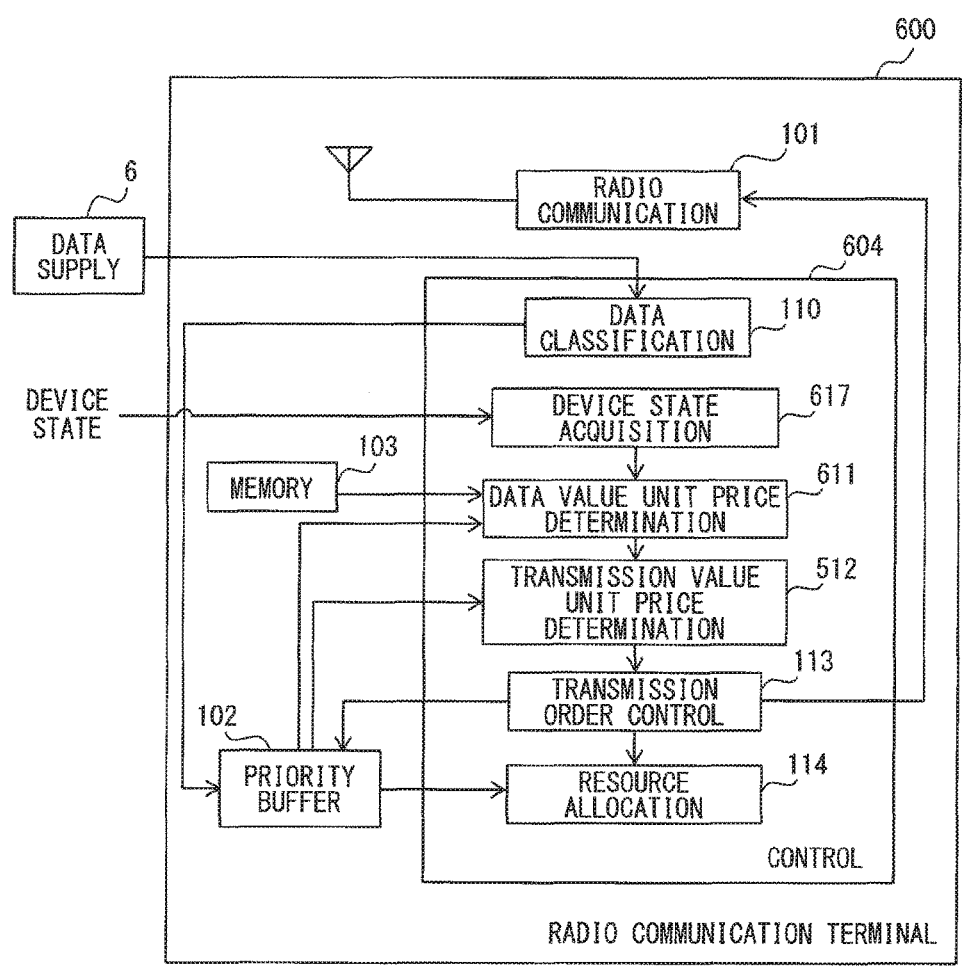
FIG. 21 is a block diagram of a radio communication terminal according to a sixth embodiment.

As shown in FIG. 21, a control part 804 of a radio communication terminal 600 includes a data value unit price determination part 611 and a device state acquisition part 617. Processing of the data value unit price determination part 611 is different from those of the foregoing embodiments.

The device state acquisition part 617 acquires a predetermined type of device state of a movable device, that is, the vehicle 2, in which the radio communication terminal 600 is mounted. The device state may, for example, a present position, present time and a vehicle operation state of the vehicle 2. The operation state of the vehicle includes, for example, whether the vehicle 2 is traveling, the vehicle 2 is being charged or a wiper is wiping a windshield. These device states are acquired through CAN.

The data value unit price determination part 611 determines the data value unit price of the transmission data stored in the priority buffer 102 in the similar manner as the data value unit price determination part 111 in the foregoing embodiments. The data value unit price determination part 611 in the sixth embodiment acquires, however, the data value unit price of the transmission data stored in the priority buffer 102 from the device state acquired by the device state acquisition part 617 and the data value map. The data value map is stored in the memory part 103.

Figure 22:
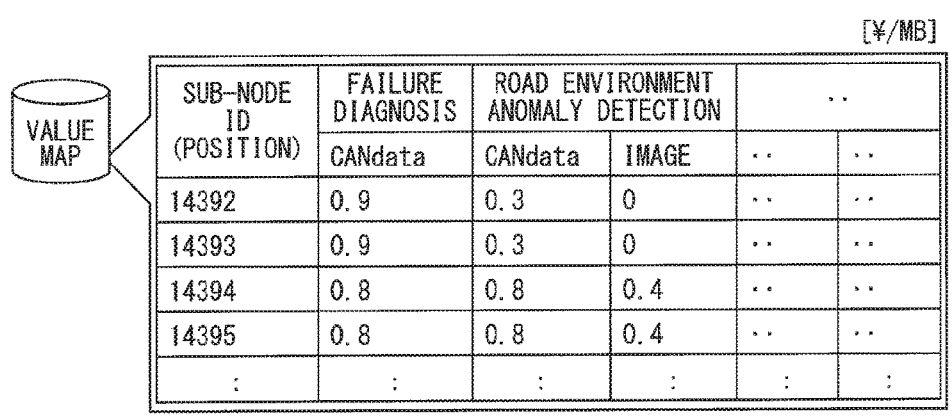
FIG. 22 is a chart showing one example of a data value map.

One example of the data value map is shown in FIG. 22. The data value map shown in FIG. 22 determines, for each position, that is, each sub-node ID, the data value unit price of the CAN data of the failure diagnosis service and the data value unit prices of the CAN data and the image data of the road environment anomaly detection service. The position referred to in FIG. 22 indicates the present position. The present position is one example of the device state and the CAN data and the image data are types of the transmission data. For this reason, this data value map is one example of a relation that the data value unit price is determined based on the device state and the type of the transmission data.

The data value unit price determination part 611 searches for the data value unit price, which corresponds to the present position acquired by the device state acquisition part 617, from the data value map and determines the data value unit price.

In FIG. 22, the present position is shown exemplarily as the device state for determination of the data value unit price. However, the data value map may define the data value unit price relative to a different device state other than the present position, for example, present time and vehicle travel state, and the type of the transmission data. Further, the data value map may define the data value unit price relative to operation states of plural devices, for example, present time and wiper operation state, and the type of the transmission data.

By determining the data value unit price based on the data value map, it is possible to dynamically change the data value unit price. For example, it is possible in the road environment anomaly detection service to variably raise the data value unit price of the position and time of less traffic and insufficient data and the position of high likelihood of regulations. As a result, it is possible to transmit the transmission data, the value of transmission of which is higher, with priority.

<Seventh Embodiment>

In the sixth embodiment described above, the data value unit price is searched by using the device state as search key. In a seventh embodiment, the data value unit price is searched by using a metadata as a search key.

Figure 23:
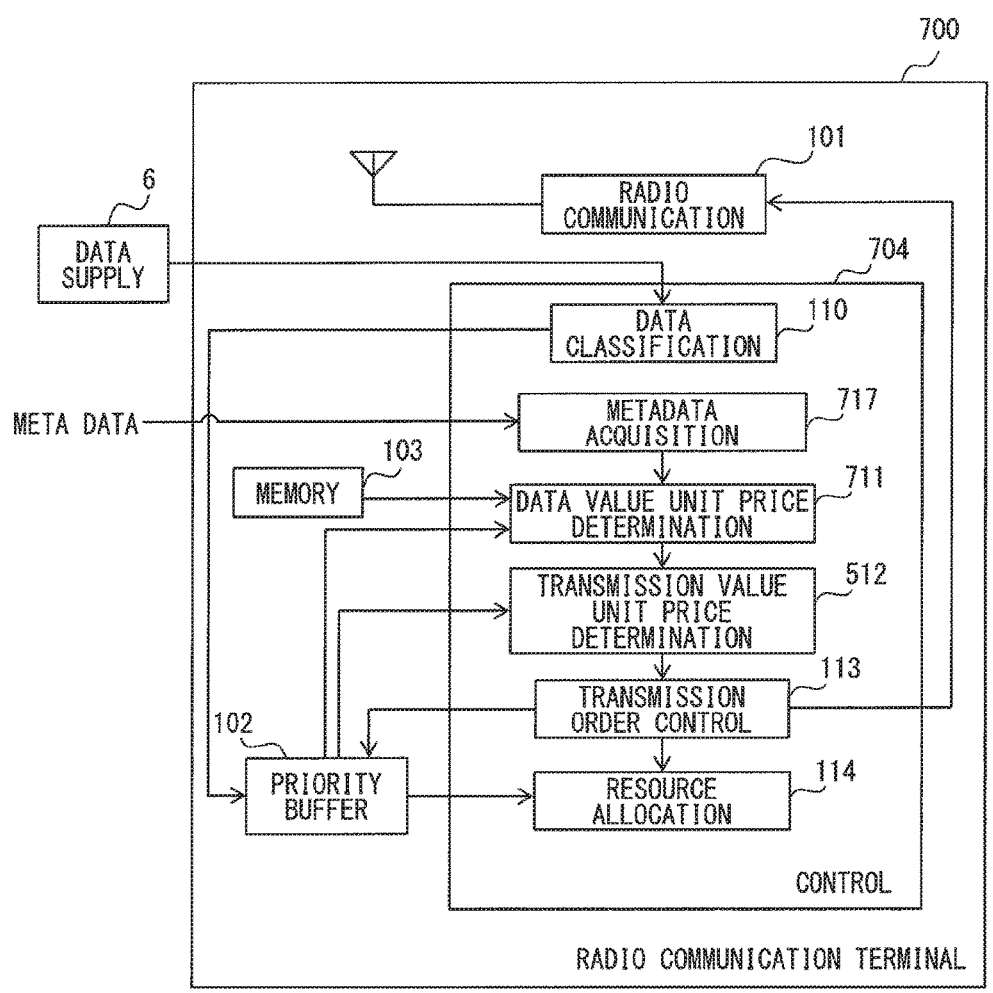
FIG. 23 is a block diagram of a radio communication terminal according to a seventh embodiment.

As shown in FIG. 23, a control part 704 of a radio communication terminal 700 includes a data value unit price determination part 711 and a metadata acquisition part 717. Processing of the data value unit price determination part 711 is different from those of the foregoing embodiments.

The metadata acquisition part 717 acquires metadata of the transmission data. The metadata is data accompanying to the transmission data. For example, in case that the transmission data is image data, its image quality, error rate and the like are metadata. In case that the transmission data is data acquired from a sensor, its position of measurement, time of measurement and the like are metadata. The metadata may be acquired through CAN. The acquired metadata is stored in the priority buffer 102 in a manner to correspond to the transmission data.

The data value unit price determination part 711 acquires the metadata stored in the priority buffer 102 in correspondence to the transmission data and also the data value unit price of the transmission data stored in the priority buffer 102 from a data value map. The data value map is stored in the memory part 103.

The data value map in the seventh embodiment is a map, which is similar to the data value map described with reference to FIG. 22 but a column of metadata is provided in place of the device state.

By determining the data value unit price by using this data value map, it is possible to vary dynamically the data value unit price. In the seventh embodiment, it is possible to increase the data value unit price of the sensor data measured at a position and time, at which traffic is not heavy and the amount of data is scarce. Accordingly, it is also possible in the seventh embodiment to transmit the transmission data having higher value with priority.

<Eighth Embodiment>

In an eighth embodiment, the data value unit price is determined based on a random number. A configuration of a radio communication terminal 800 according to the eighth embodiment is shown in FIG. 24.

Figure 24:
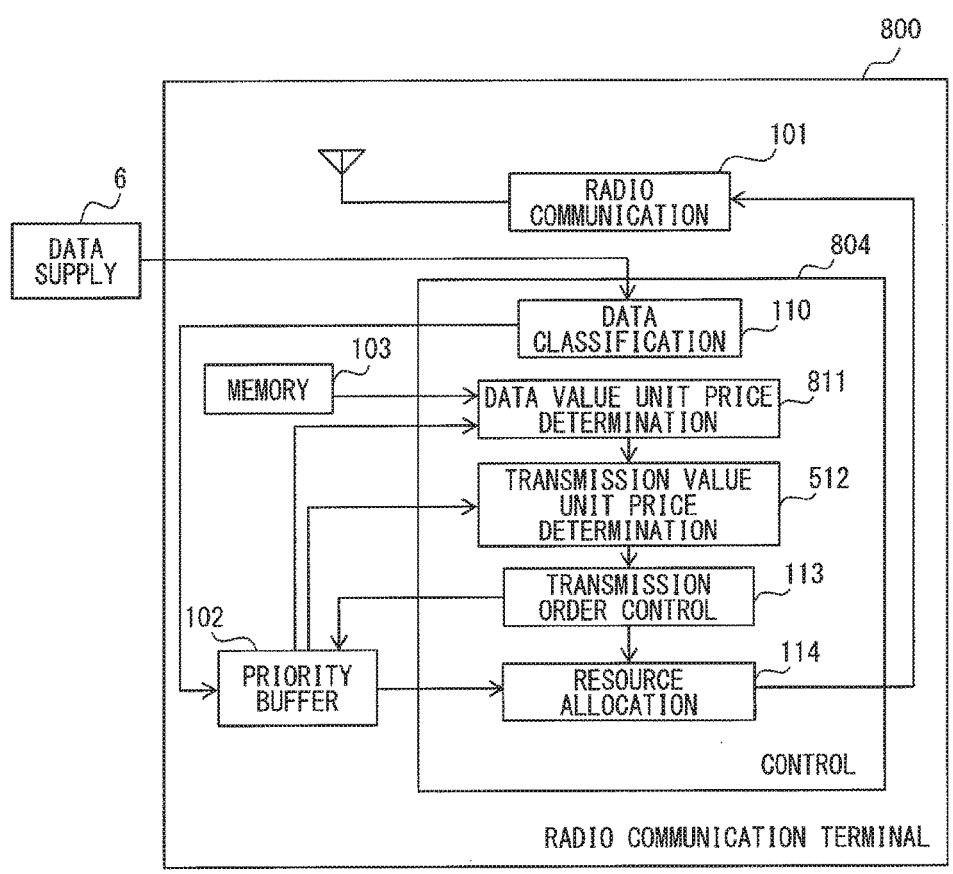
FIG. 24 is a block diagram of a radio communication terminal according to an eighth embodiment.

As shown in FIG. 24, a control part 804 of a radio communication terminal 800 according to the eighth embodiment includes a data value unit price determination part 811, processing of which is different from those of the foregoing embodiments.

The data value unit price determination part 811 determines the data value unit price based on the random number. For example, in the processing shown in FIG. 5, the data value unit price determination part 811 uses a value generated based on the random number as an initial value of the data value unit price for the data type at S5, which is executed first after power supply is turned on.

Determination of the data value unit price based on the random number is effective in case that a multiple number of radio communication terminals exist in a narrow area. In case that the data value unit price of the transmission data for the same service and same data type, the multiple number of radio communication terminals tend to transmit or fail to transmit the transmission data.

However, it is sufficient for the radio communication terminal mounted in one of vehicles 2 to transmit the image data of a location where a road abnormality is detected, although high communication quality is requested.

In such a case, it is effective to determine the data value unit price based on the random number. For this reason, the data value unit price may be determined by using the random number in case of a determination that there exist more than a predetermined number of other radio communication terminals in a predetermined area around the vehicle. Further, the data value unit price may be determined based on the random number by limiting the data type, for example, by limiting the data type to the image.

In case of determining the data value unit price based on the random number, the random number may follow a probability distribution. The probability distribution may be a normal probability distribution, in which an average value equals the fixed value described in the first embodiment. Assuming that the average value equals the fixed value described in the first embodiment, it is possible to raise the probability of transmission of the transmission data from either one of the radio communication terminals without changing a total data value unit price of all vehicles 2.

In case that the average value of the probability distribution equals the fixed value described in the first embodiment, the average value of the data value unit price of the transmission data transmitted actually becomes higher than in a case of using the fixed value. For this reason, the average value of the probability distribution may be set to be lower than the fixed value described in the first embodiment. It is also allowable to increase a variance value or set an upper limit value.

<Ninth Embodiment>

Figure 25:
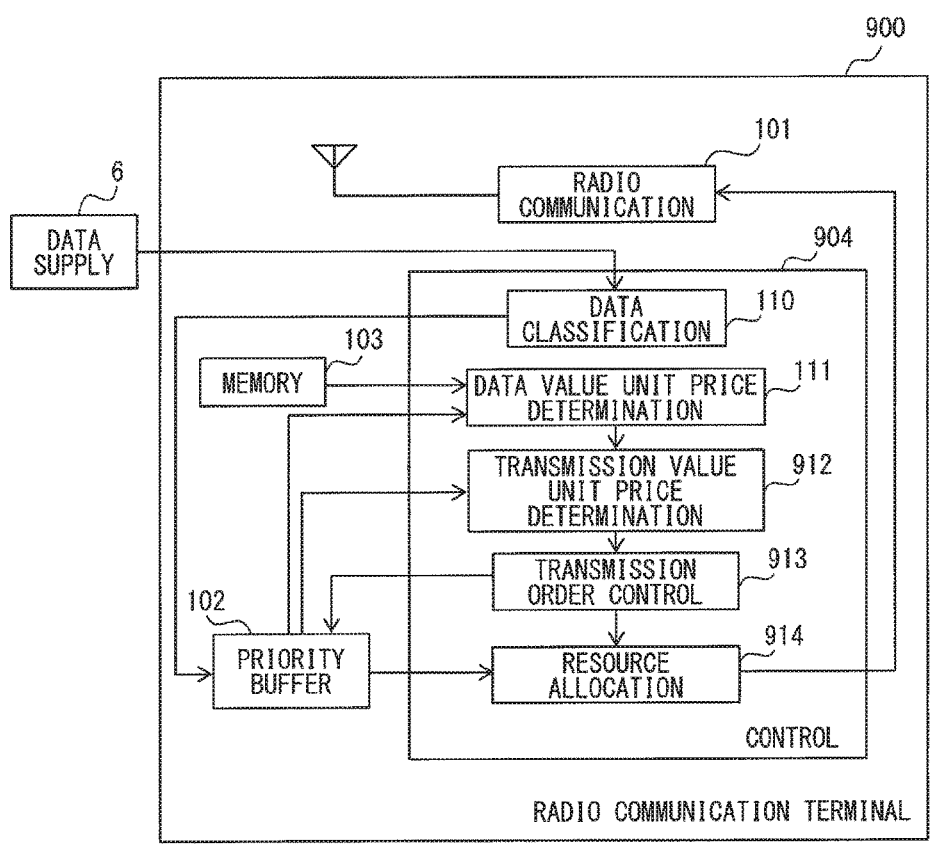
FIG. 25 is a block diagram of a radio communication terminal according to a ninth embodiment.

In a ninth embodiment, as shown in FIG. 25, a control part 904 of a radio communication terminal 900 includes a transmission value unit price determination part 912, a transmission order control part 913 and a resource allocation part 914 and processing of which are different from those in the foregoing embodiments.

In the foregoing embodiments, the transmission data value unit price of the transmission data is determined only once. In some cases, certain time lapses from determination of the transmission data value unit price to actual transmission of the transmission data. Further, during a period from the determination of the transmission data value unit price to the actual transmission of the transmission data, it is likely that the transmission data, the data value unit price of which is increased, is stored in the priority buffer 102.

In addition, during the period from the determination of the transmission data value unit price to the actual transmission of the transmission data, it is also likely that the transmission data stored in the priority buffer 102 becomes unnecessary to be transmitted. The transmission data may become unnecessary to be transmitted in such a case that a deletion of the transmission data is requested from the data supply part 6.

Further, the data value map may be changed upon a request from a user or an application, which executes the service.

In addition, since the real time property of the transmission data of the best effort type is soft, its data value may decrease with a lapse of time before the transmission. For this reason, the transmission data value unit price may be decreased with the lapse of time. An amount or function of decrease of the transmission data caused with time lapse may be defined for each service.

For these reasons, the transmission value unit price determination part 912 determines the transmission data value unit price repeatedly even after determining the transmission data value unit price.

Similarly to the transmission value unit price determination part 212 in the second embodiment, the transmission value unit price determination part 912 determines the transmission data value unit price by adding the data value unit prices of the same transmission data in case that the same transmission data exist in the same priority class of the priority buffer 102.

Further, the transmission value unit price determination part 912 determines the transmission data value unit price again by subtracting the data value unit price of the transmission data, which is requested to be deleted in case of acquisition of the request for deleting the transmission data corresponding to the data value unit price, which is used in the calculation of the transmission data value unit price, from the data supply part 6, which supplied the transmission data.

In case that the transmission data value unit price is changed, the transmission order control part 913 reassigns the transmission order. In case that the transmission order is changed, the resource allocation part 914 allocates the communication resource again.

<Tenth Embodiment>

Figure 26:
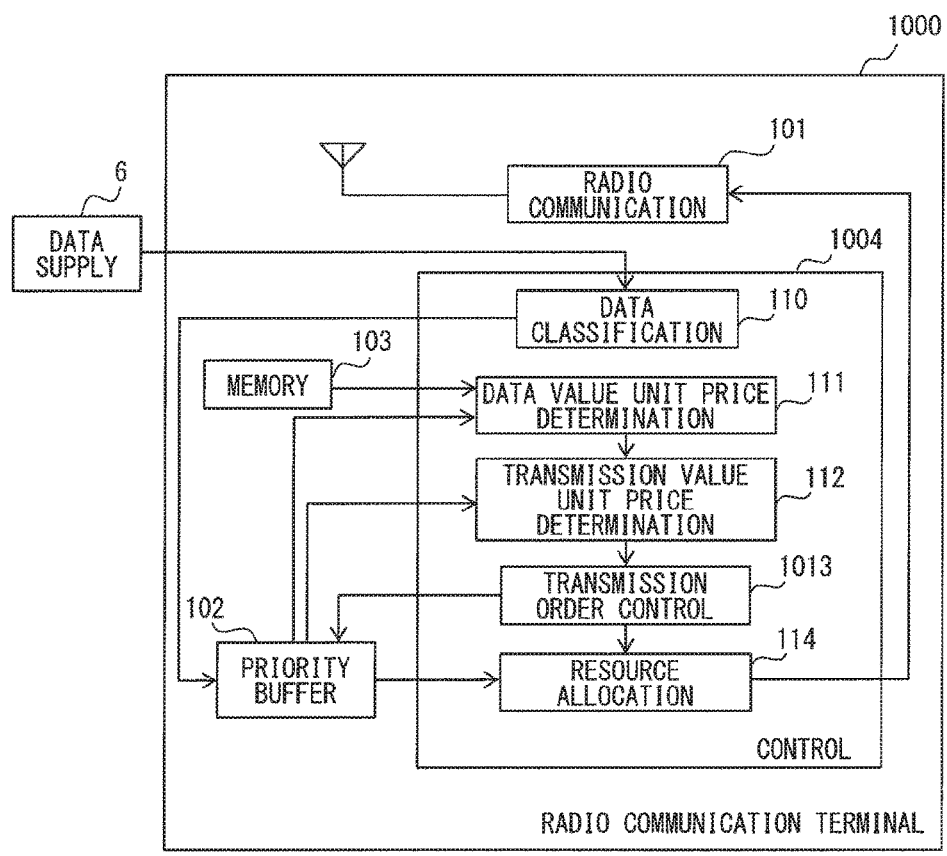
FIG. 26 is a block diagram of a radio communication terminal according to a tenth embodiment.

A configuration of a radio communication terminal 26 according to a tenth embodiment is shown in FIG. 26. A control part 1004 of the radio communication terminal 1000 according to the tenth embodiment includes a transmission order control part 1013 and processing of the transmission order control part 1013 is different from those of the foregoing embodiments.

Figure 27:
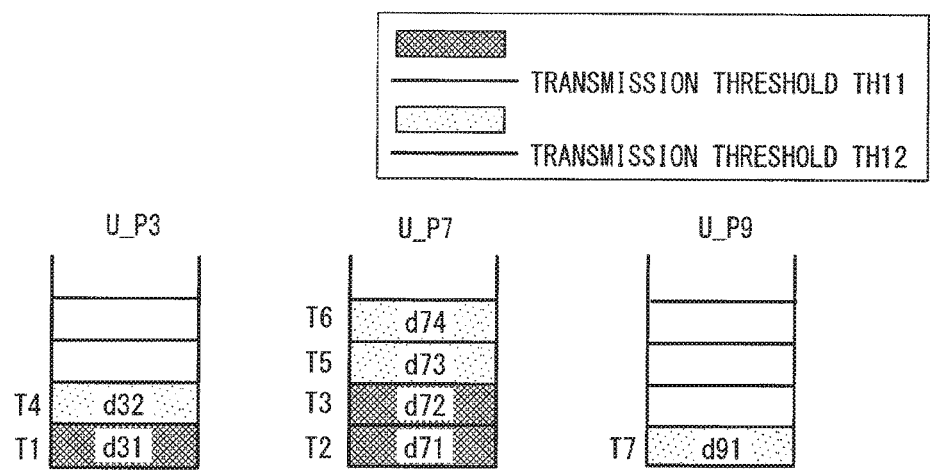
FIG. 27 is a chart showing a relation between a transmission data value unit price and two transmission threshold values.

As shown in FIG. 27, the radio communication part 1013 uses two threshold values TH, that is, first and second transmission threshold values TH1 and TH2. The first threshold value TH1 is larger than the second threshold value TH2 (TH1>TH2). The transmission data relative to the transmission threshold values TH1 and TH2 are differentiated by darkness level in FIG. 27. The transmission data value unit prices of the transmission data d31, d71 and d72 are higher than the first transmission threshold value TH1. The transmission data value unit prices of the transmission data d32, d73, d74 and d91 are higher than the second transmission threshold value TH2 but lower than the first transmission threshold value TF1.

The radio communication part 1013 assigns the transmission orders by sequentially using two transmission threshold values TH from the larger one of the first and second threshold values TH1 and TH2.

In an example of FIG. 27, the first transmission threshold values TH1 is used first. The transmission data value unit price larger than the first transmission threshold value TH1 are the transmission data d31, d71 and d72. Among these three transmission data d31, d71 and d72, the priority class of the transmission data d31 is the highest. For this reason, the transmission order is assigned first to the transmission data d31. In FIG. 27, Tn (n=1, 2, 3, . . . ) indicates the transmission order.

The transmission data, the transmission orders of which are second and third, are the transmission data d71 and the transmission data d72, respectively. The transmission data, the transmission order of which are fourth and subsequent numbers, are the transmission data, the transmission data value unit prices of which are lower than the first transmission threshold value TH1. Specifically, the transmission orders are assigned in the order from d32 to d91 through d73 and d74.

By thus setting two threshold values TH1 and TH2, it is possible to transmit the transmission data, the transmission data value unit price of which is high, at earlier time. Three or more threshold values TH may be used.

The present disclosure is not limited to the embodiments described above but may be implemented differently as exemplified as modifications described below.

<First Modification>

In case that the transmission data is divided, a header need be attached to each divided transmission data and hence the amount of communication increases in comparison to a case that the transmission data is not divided. It is therefore allowable to determine not to divide the transmission data in case that elements of the difference set is not many.

<Second Modification>

The data transmission described above in an uplink transmission may also be implemented as in a downlink transmission.

What is claimed is:

1. A radio communication terminal comprising:
   a data classification part configured to acquire transmission data from a data supply source, classify the transmission data acquired form the data supply source by priority class based on a communication quality request, which is determined by types of the transmission data, and store the transmission data in a priority buffer in correspondence to the priority class;
   a data value unit price determination part configured to determine a data value unit price of the transmission data stored in the priority buffer;
   a transmission value unit price determination part configured to determine a transmission data value unit price based on the data value unit price determined by the data value unit price determination part;
   a transmission order control part configured to assign a transmission order to the transmission data having the transmission data value unit price higher than a predetermined transmission threshold value, based on the priority class classified by the data classification part;
   a resource allocation part configured to allocate a communication resource to the transmission data based on the transmission order determined by the transmission data control part; and
   a transmission part configured to transmit the transmission data by the communication resource allocated by the resource allocation part,
   wherein
   the transmission value unit price determination part is configured to determine, in case that the priority buffer stores same transmission data in same priority classes, the transmission data value unit price by adding the data value unit price of the same transmission data, and
   the transmission value unit price determination part is configured to determine, in case that the transmission data unit price is determined by adding plural data value unit prices and the request of deletion of the transmission data corresponding to the data value unit price used for calculation of the transmission data value unit price is acquired from the data supply part, the transmission data value unit price again by subtracting the data value unit price of the transmission data, which is requested to be deleted, from the transmission data value unit price.

2. The radio communication terminal according to claim 1, further comprising:
   a metadata acquisition part configured to acquired metadata of the transmission data stored in the priority buffer,
   wherein the data value unit price determination part is configured to determine the data value unit price of the transmission data stored in the priority buffer by using the metadata acquired by the metadata acquisition part and a relation, by which the data value unit price is determined based on the metadata and the type of the transmission data.

3. The radio communication terminal according to claim 1, wherein:
   the data value unit price determination part is configured to determine a data value unit price of the transmission data based on a random number.

4. The radio communication terminal according to claim 1, wherein:
   the transmission value unit price determination part is configured to determine repeatedly the transmission data value unit price until the transmission data is transmitted even after determining the transmission data unit price;
   the transmission order control part is configured to reassign the transmission order in case that the transmission data value unit price is changed; and
   the resource allocation part is configured to reassign the communication resource in case that the transmission order is changed.

5. The radio communication terminal according to claim 1, wherein:
the transmission order control part has plural transmission threshold values, which are different from one another, as the transmission threshold value and determines the transmission order by using the plural transmission threshold values in an order from a larger threshold value.

6. A radio communication terminal comprising:
a data classification part configured to acquire transmission data from a data supply source, classify the transmission data acquired form the data supply source by priority class based on a communication quality request, which is determined by types of the transmission data, and store the transmission data in a priority buffer in correspondence to the priority class;
a data value unit price determination part configured to determine a data value unit price of the transmission data stored in the priority buffer;
a transmission value unit price determination part configured to determine a transmission data value unit price based on the data value unit price determined by the data value unit price determination part;
a transmission order control part configured to assign a transmission order to the transmission data having the transmission data value unit price higher than a predetermined transmission threshold value, based on the priority class classified by the data classification part;
a resource allocation part configured to allocate a communication resource to the transmission data based on the transmission order determined by the transmission data control part;
a transmission part configured to transmit the transmission data by the communication resource allocated by the resource allocation part;
an inclusion relation check part configured to check, in case that the priority buffer stores two sets of the transmission data of same type and the two sets of the transmission data form a product set, whether the product set is a subset or a set having no inclusion relation; and
a reference value unit price calculation part configured to calculate a reference value unit price in case that the inclusion relation check part determines that the product set is the subset,
wherein
the transmission value unit price determination part is configured to determine, in case that the priority buffer stores same transmission data in same priority classes, the transmission data value unit price by adding the data value unit price of the same transmission data,
the reference value unit price calculation part is configured to calculate a data value relative to the subset based on the data value unit price of the transmission data, which is the subset, and a number of data of the subset, calculate a data value of a superset relative to the subset based on the data value unit price of the transmission data of the superset and a number of data of the super set, and divide a sum of the data value of the subset and the data value of the super set by the number of data of the super set, and
the transmission value unit price determination part is configured to determine, in case that the reference value unit price is lower than the data value unit price of the transmission data of the subset, the transmission data value unit price by adding the data value unit price of the transmission data of the super set and a value of product of two values, one of which is a value of division of the number of data of the subset by the number of data of the super set and the other of which is the data value unit price of the transmission data of the subset.

7. The radio communication terminal according to claim 6, wherein:
assuming that, in case that the inclusion relation check part is configured to determine that the product set is not the subset, one of the two sets of the transmission data, the transmission data unit price of which is higher, is a first transmission data and an other of the two sets of the transmission data is a second transmission data,
the transmission value unit price determination part is configured to determine the transmission data value unit price of the first transmission data to be a sum of the data value unit price of the first transmission data and a value of product of two values, one of which is a value of division of the number of data of the second transmission data divided by the number of data of the first transmission data and the other of which is the data value unit price of the second transmission data, and further determine the data value unit price to be the transmission data value unit price of data, which is not included in the first transmission data.

8. The radio communication terminal according to claim 6, further comprising:
a metadata acquisition part configured to acquired metadata of the transmission data stored in the priority buffer,
wherein the data value unit price determination part is configured to determine the data value unit price of the transmission data stored in the priority buffer by using the metadata acquired by the metadata acquisition part and a relation, by which the data value unit price is determined based on the metadata and the type of the transmission data.

9. The radio communication terminal according to claim 6, wherein:
the data value unit price determination part is configured to determine a data value unit price of the transmission data based on a random number.

10. The radio communication terminal according to claim 6, wherein:
the transmission value unit price determination part is configured to determine repeatedly the transmission data value unit price until the transmission data is transmitted even after determining the transmission data unit price;
the transmission order control part is configured to reassign the transmission order in case that the transmission data value unit price is changed; and
the resource allocation part is configured to reassign the communication resource in case that the transmission order is changed.

11. The radio communication terminal according to claim 6, wherein:
the transmission order control part has plural transmission threshold values, which are different from one another, as the transmission threshold value and determines the transmission order by using the plural transmission threshold values in an order from a larger threshold value.

12. A radio communication terminal comprising:
a data classification part configured to acquire transmission data from a data supply source, classify the transmission data acquired form the data supply source by priority class based on a communication quality request, which is determined by types of the transmission data, and store the transmission data in a priority buffer in correspondence to the priority class;

a data value unit price determination part configured to determine a data value unit price of the transmission data stored in the priority buffer;

a transmission value unit price determination part configured to determine a transmission data value unit price based on the data value unit price determined by the data value unit price determination part;

a transmission order control part configured to assign a transmission order to the transmission data having the transmission data value unit price higher than a predetermined transmission threshold value, based on the priority class classified by the data classification part;

a resource allocation part configured to allocate a communication resource to the transmission data based on the transmission order determined by the transmission data control part;

a transmission part configured to transmit the transmission data by the communication resource allocated by the resource allocation part;

a derivation relation check part configured to check, in case that the priority buffer stores two sets of the transmission data of same type and the two sets of the transmission data are first transmission data and second transmission data, whether there is a derivation relation by which the second transmission data is derivable by abstracting the first transmission data assuming that the first transmission data is derivation source data; and a reference value unit price calculation part configured to calculate a reference value unit price in case that the derivation relation check part determines that there is the derivation relation, wherein the transmission value unit price determination part is configured to determine, in case that the priority buffer stores same transmission data in same priority classes, the transmission data value unit price by adding the data value unit price of the same transmission data, the reference value unit price calculation part is configured to calculate the reference value unit price as a sum of the data value unit price of the first data and a product value of an abstraction rate of the second transmission data relative to the first transmission data and the data value unit price of the second transmission data, and the transmission value unit price determination part is configured to determine, in case that the reference value unit price is higher than the data value unit price of the second transmission data, the transmission data value unit price of the first transmission data.

13. The radio communication terminal according to claim 12, further comprising:

a metadata acquisition part configured to acquired metadata of the transmission data stored in the priority buffer, wherein the data value unit price determination part is configured to determine the data value unit price of the transmission data stored in the priority buffer by using the metadata acquired by the metadata acquisition part and a relation, by which the data value unit price is determined based on the metadata and the type of the transmission data.

14. The radio communication terminal according to claim 12, wherein:

the data value unit price determination part is configured to determine a data value unit price of the transmission data based on a random number.

15. The radio communication terminal according to claim 12, wherein:

the transmission value unit price determination part is configured to determine repeatedly the transmission data value unit price until the transmission data is transmitted even after determining the transmission data unit price;

the transmission order control part is configured to reassign the transmission order in case that the transmission data value unit price is changed; and the resource allocation part is configured to reassign the communication resource in case that the transmission order is changed.

16. The radio communication terminal according to claim 12, wherein:

the transmission order control part has plural transmission threshold values, which are different from one another, as the transmission threshold value and determines the transmission order by using the plural transmission threshold values in an order from a larger threshold value.

17. A radio communication terminal comprising:

a data classification part configured to acquire transmission data from a data supply source, classify the transmission data acquired form the data supply source by priority class based on a communication quality request, which is determined by types of the transmission data, and store the transmission data in a priority buffer in correspondence to the priority class;

a data value unit price determination part configured to determine a data value unit price of the transmission data stored in the priority buffer;

a transmission value unit price determination part configured to determine a transmission data value unit price based on the data value unit price determined by the data value unit price determination part;

a transmission order control part configured to assign a transmission order to the transmission data having the transmission data value unit price higher than a predetermined transmission threshold value, based on the priority class classified by the data classification part;

a resource allocation part configured to allocate a communication resource to the transmission data based on the transmission order determined by the transmission data control part;

a transmission part configured to transmit the transmission data by the communication resource allocated by the resource allocation part; and a device state acquisition part configured to acquire a predetermined device state of a mobile device, in which the radio communication terminal is mounted, wherein the data value unit price determination part is configured to determine the data value unit price of the transmission data stored in the priority buffer by using the device state acquired by the device state acquisition part and a relation, by which the data value unit price is determined based on the device state and the transmission data type.

18. The radio communication terminal according to claim 17, further comprising:

a metadata acquisition part configured to acquired metadata of the transmission data stored in the priority buffer, wherein the data value unit price determination part is configured to determine the data value unit price of the transmission data stored in the priority buffer by using the metadata acquired by the metadata acquisition part and a relation, by which the data value unit price is determined based on the metadata and the type of the transmission data.

19. The radio communication terminal according to claim 17, wherein:

the data value unit price determination part is configured to determine a data value unit price of the transmission data based on a random number.

20. The radio communication terminal according to claim 17, wherein:

the transmission value unit price determination part is configured to determine repeatedly the transmission data value unit price until the transmission data is transmitted even after determining the transmission data unit price;

the transmission order control part is configured to reassign the transmission order in case that the transmission data value unit price is changed; and the resource allocation part is configured to reassign the communication resource in case that the transmission order is changed.

21. The radio communication terminal according to claim 17, wherein:

the transmission order control part has plural transmission threshold values, which are different from one another, as the transmission threshold value and determines the transmission order by using the plural transmission threshold values in an order from a larger threshold value.

* * * * *